(12) United States Patent
Criezis et al.

(10) Patent No.: US 11,490,629 B2
(45) Date of Patent: Nov. 8, 2022

(54) HIGH SOLIDS CONCENTRATED DAIRY LIQUIDS

(75) Inventors: Anthony William Criezis, Annville, PA (US); Bruce E. Campbell, Glenview, IL (US); Lisa Ann Dierbach, Arlington Heights, IL (US); Nicholas J. Mendoza, Croton on Hudson, NY (US); Sarita V. Porbandarwala, Fair Lawn, NJ (US); Gavin M. Schmidt, Hoffman Estates, IL (US); Gregory Aaron Wiseman, New York, NY (US)

(73) Assignee: Koninklijke Douwe Egberts B.V., Utrecht (NL)

( * ) Notice: Subject to any disclaimer, the term of this patent is extended or adjusted under 35 U.S.C. 154(b) by 1005 days.

(21) Appl. No.: 13/820,895

(22) PCT Filed: Sep. 8, 2011

(86) PCT No.: PCT/US2011/050847
§ 371 (c)(1),
(2), (4) Date: Aug. 26, 2013

(87) PCT Pub. No.: WO2012/033927
PCT Pub. Date: Mar. 15, 2012

(65) Prior Publication Data
US 2013/0330460 A1    Dec. 12, 2013

Related U.S. Application Data

(60) Provisional application No. 61/380,942, filed on Sep. 8, 2010.

(51) Int. Cl.
A23C 9/00 (2006.01)
A23C 9/142 (2006.01)

(52) U.S. Cl.
CPC ............ *A23C 9/005* (2013.01); *A23C 9/1422* (2013.01)

(58) Field of Classification Search
CPC ............................ A23C 9/1422; A23C 9/005
(Continued)

(56) References Cited

U.S. PATENT DOCUMENTS 1,564,262 A * 12/1925 Mellott .................... A23G 1/56
                                                    426/407
2,334,317 A    11/1943 Crighton
(Continued)

FOREIGN PATENT DOCUMENTS

CH        486208 A     2/1970
CN     101026963 A     8/2007
(Continued)

OTHER PUBLICATIONS

Mohan "Buffers". Available online at wolfson.huji.ac.il/purification/PDF/Buffers/Calbiochem_Buffers_Booklet.pdf (Year: 2003).*
(Continued)

*Primary Examiner* — Erik Kashnikow
*Assistant Examiner* — Assaf Zilbering
(74) *Attorney, Agent, or Firm* — Fitch, Even, Tabin & Flannery, LLP

(57) ABSTRACT

The methods and products disclosed herein relate to high solids concentrated dairy liquids that remain retort and shelf stable for an extended shelf life at ambient conditions with substantially no negative flavor notes typically found in the prior retorted dairy liquids. In one aspect, the stable concentrated dairy liquids have up to about 50 percent total solids, and in some approaches, between about 38 and about 50 percent total solids. In another aspect, the high solids concentrated dairy liquids may also include increased levels of sugar relative to the dairy solids and/or increased levels
(Continued)

of sugar relative to the protein and fat to aid in achieving stability.

13 Claims, 4 Drawing Sheets

(58) Field of Classification Search
USPC .......................................................... 426/587
See application file for complete search history.

(56) References Cited

U.S. PATENT DOCUMENTS

| | | |
|---|---|---|
| 2,860,057 A | 9/1955 | Wilcox |
| 2,860,053 A | 11/1958 | Fitzhugh |
| 3,210,201 A | 10/1965 | Tumerman |
| 3,348,955 A | 10/1967 | Stewart |
| 3,880,755 A | 4/1975 | Thomas et al. |
| 3,922,375 A | 11/1975 | Dalan et al. |
| 3,977,967 A | 8/1976 | Trulson et al. |
| 4,282,262 A | 8/1981 | Blake |
| 4,529,611 A | 7/1985 | Uiterwaal |
| 4,698,303 A | 10/1987 | Bailey et al. |
| 4,876,100 A | 10/1989 | Holm et al. |
| 4,897,277 A | 1/1990 | Dieu et al. |
| 4,906,362 A | 3/1990 | Holm et al. |
| 4,931,185 A | 6/1990 | Bourgeois et al. |
| 4,931,302 A | 6/1990 | Leshik et al. |
| 4,956,093 A | 9/1990 | Pirbazari et al. |
| 4,981,704 A | 1/1991 | Thibault |
| 5,077,067 A | 12/1991 | Thibault |
| 5,085,881 A | 2/1992 | Moeller |
| 5,087,449 A | 2/1992 | Masai et al. |
| 5,149,647 A | 9/1992 | Burling |
| 5,152,897 A | 10/1992 | Shibuta et al. |
| 5,169,666 A | 12/1992 | Woychik |
| 5,256,437 A | 10/1993 | Degen et al. |
| 5,260,080 A | 11/1993 | Noel |
| 5,306,420 A | 4/1994 | Bisconte |
| 5,338,553 A | 8/1994 | Johnson et al. |
| 5,344,565 A | 9/1994 | Degen et al. |
| 5,356,637 A | 10/1994 | Loosen et al. |
| 5,356,640 A | 10/1994 | Jameson et al. |
| 5,356,651 A | 10/1994 | Degen et al. |
| 5,395,636 A | 3/1995 | Degen et al. |
| 5,420,249 A | 5/1995 | De Wit et al. |
| 5,427,769 A | 6/1995 | Berrocal et al. |
| 5,456,843 A | 10/1995 | Koenhen |
| 5,468,844 A | 11/1995 | Smith |
| 5,503,729 A | 4/1996 | Elyanow et al. |
| 5,503,864 A | 4/1996 | Uchida et al. |
| 5,503,865 A | 4/1996 | Behringer et al. |
| 5,512,307 A | 4/1996 | Hammond |
| 5,560,828 A | 10/1996 | Wenten et al. |
| 5,670,196 A | 9/1997 | Gregory |
| 5,679,780 A | 10/1997 | Jensen et al. |
| 5,681,728 A | 10/1997 | Miao |
| 5,683,733 A | 11/1997 | Krabsen et al. |
| 5,683,984 A | 11/1997 | Jost |
| 5,685,990 A | 11/1997 | Saugmann et al. |
| 5,691,165 A | 11/1997 | Nielsen et al. |
| 5,766,666 A | 6/1998 | Streiff et al. |
| 5,783,237 A | 7/1998 | Sanderson et al. |
| 5,834,042 A | 11/1998 | Savolainen |
| 5,844,104 A | 12/1998 | Yanahira et al. |
| 5,865,899 A | 2/1999 | Theoleyre et al. |
| 5,902,625 A | 5/1999 | Barz et al. |
| 5,925,737 A | 7/1999 | Tomasula et al. |
| 5,935,632 A | 8/1999 | Larsen |
| 5,952,207 A | 9/1999 | Gonzalez et al. |
| 6,010,698 A | 1/2000 | Kussendrager et al. |
| 6,033,700 A | 3/2000 | Berrocal et al. |
| 6,060,105 A | 5/2000 | Meister et al. |
| 6,060,269 A | 5/2000 | Chatterton et al. |
| 6,071,356 A | 6/2000 | Olsen |
| 6,103,277 A | 8/2000 | Leufstedt et al. |
| 6,117,470 A | 9/2000 | Lindquist |
| 6,120,820 A | 9/2000 | Brody et al. |
| 6,126,754 A | 10/2000 | Duflot |
| 6,139,901 A | 10/2000 | Blazey et al. |
| 6,155,432 A | 12/2000 | Wilson et al. |
| 6,171,621 B1 | 1/2001 | Braun et al. |
| 6,177,265 B1 | 1/2001 | Duflot |
| 6,270,823 B1 | 8/2001 | Jolkin |
| 6,326,044 B1 | 12/2001 | Lindquist |
| 6,383,540 B1 | 5/2002 | Noel |
| 6,390,304 B1 | 5/2002 | Wilson et al. |
| 6,478,969 B2 | 11/2002 | Brantley et al. |
| 6,485,762 B1 | 11/2002 | Rizvi et al. |
| 6,506,305 B2 | 1/2003 | Morita et al. |
| 6,511,694 B2 * | 1/2003 | Huang ............... A23G 9/34 426/565 |
| 6,521,277 B1 | 2/2003 | Mortensen |
| 6,551,648 B1 | 4/2003 | Goudedranche et al. |
| 6,555,659 B1 | 4/2003 | Ayers et al. |
| 6,635,296 B1 | 10/2003 | Nissen et al. |
| 6,635,302 B1 | 10/2003 | Huang et al. |
| 6,652,898 B2 | 11/2003 | Jensen |
| 6,716,617 B1 | 4/2004 | Kiy |
| 6,767,575 B1 | 7/2004 | Huss et al. |
| 6,787,158 B1 | 9/2004 | Erdmann et al. |
| 6,800,739 B2 | 10/2004 | Davis et al. |
| 6,827,960 B2 | 12/2004 | Kopf et al. |
| 6,866,879 B1 | 3/2005 | Vaarala et al. |
| 6,887,505 B2 | 5/2005 | Reaves et al. |
| 6,921,548 B2 | 7/2005 | McCampbell |
| 7,018,665 B2 | 3/2006 | Ayers et al. |
| 7,026,004 B2 | 4/2006 | Loh et al. |
| 7,285,301 B2 | 10/2007 | McCampbell |
| 2001/0026825 A1 | 10/2001 | Reaves et al. |
| 2002/0019325 A1 | 2/2002 | Olsen |
| 2002/0183489 A1 | 12/2002 | Davis et al. |
| 2003/0038081 A1 | 2/2003 | Wang et al. |
| 2003/0054068 A1 | 3/2003 | Dybing et al. |
| 2003/0054079 A1 | 3/2003 | Reaves et al. |
| 2003/0178507 A1 | 9/2003 | Maria Rijn Van |
| 2004/0009281 A1 | 1/2004 | Green |
| 2004/0040448 A1 | 3/2004 | Dunker et al. |
| 2004/0052860 A1 | 3/2004 | Reid et al. |
| 2004/0062762 A1 | 4/2004 | Mihara et al. |
| 2004/0067296 A1 | 4/2004 | Loh et al. |
| 2004/0116679 A1 | 6/2004 | Kønigsfeldt et al. |
| 2004/0167320 A1 | 8/2004 | Couto et al. |
| 2004/0188351 A1 | 9/2004 | Thiele et al. |
| 2004/0213881 A1 | 10/2004 | Chien et al. |
| 2004/0241791 A1 | 12/2004 | Edens et al. |
| 2004/0251202 A1 | 12/2004 | Yen et al. |
| 2005/0061730 A1 | 3/2005 | Moller |
| 2005/0084874 A1 | 4/2005 | Belfort et al. |
| 2005/0127001 A1 | 6/2005 | Lindemann et al. |
| 2005/0170044 A1 | 8/2005 | Lange |
| 2005/0181092 A1 | 8/2005 | Achs |
| 2005/0197496 A1 | 9/2005 | Perreault |
| 2005/0247626 A1 | 11/2005 | Clausse et al. |
| 2005/0250693 A1 | 11/2005 | Goddard et al. |
| 2005/0260305 A1 | 11/2005 | Adele et al. |
| 2005/0260672 A1 | 11/2005 | Couto et al. |
| 2006/0040025 A1 | 2/2006 | Souppe |
| 2006/0062873 A1 | 3/2006 | Yee et al. |
| 2006/0073256 A1 | 4/2006 | Destaillats et al. |
| 2006/0131236 A1 | 6/2006 | Belfort et al. |
| 2007/0172548 A1 | 7/2007 | Cale et al. |
| 2010/0104711 A1 | 4/2010 | Kimmel et al. |
| 2010/0189866 A1 | 7/2010 | Degner |

FOREIGN PATENT DOCUMENTS

| | | |
|---|---|---|
| DE | 2413193 A | 10/1974 |
| EP | 0 056 658 B1 | 4/1989 |
| EP | 0316938 A2 | 5/1989 |
| EP | 0 180 599 B1 | 4/1991 |
| EP | 0 334 776 B1 | 7/1991 |
| EP | 0 440 561 A1 | 8/1991 |
| EP | 0 022 019 B2 | 11/1991 |
| EP | 0 491 623 A1 | 6/1992 |

(56) References Cited

FOREIGN PATENT DOCUMENTS

| | | |
|---|---|---|
| EP | 0 353 422 B1 | 11/1992 |
| EP | 0 515 318 A1 | 11/1992 |
| EP | 542583 A1 | 5/1993 |
| EP | 0 546 200 A1 | 6/1993 |
| EP | 0 338 950 B1 | 8/1993 |
| EP | 0 329 559 B1 | 6/1994 |
| EP | 0 487 619 B1 | 10/1994 |
| EP | 0 636 319 A2 | 2/1995 |
| EP | 0 469 206 B1 | 3/1996 |
| EP | 0 546 641 B1 | 7/1996 |
| EP | 0 759 272 A1 | 2/1997 |
| EP | 0788313 A1 | 8/1997 |
| EP | 0 642 307 B1 | 1/1998 |
| EP | 0 544 818 B1 | 5/1998 |
| EP | 0 712 381 B1 | 1/1999 |
| EP | 0 575 121 B1 | 3/1999 |
| EP | 0 723 400 B1 | 3/2001 |
| EP | 1 158 860 B1 | 6/2002 |
| EP | 1 137 483 B1 | 7/2003 |
| EP | 0 927 042 B1 | 2/2004 |
| EP | 0 936 917 B1 | 2/2004 |
| EP | 1407673 A1 | 4/2004 |
| EP | 1 041 161 B1 | 5/2004 |
| EP | 1 133 238 B1 | 7/2004 |
| EP | 1 046 344 B1 | 9/2004 |
| EP | 1 071 341 B1 | 10/2004 |
| EP | 542583 B2 | 10/2005 |
| EP | 1 151 754 B1 | 2/2006 |
| EP | 1 623 717 A1 | 2/2006 |
| EP | 1 307 106 B1 | 3/2006 |
| EP | 1 409 539 B1 | 3/2006 |
| EP | 1 673 975 A1 | 6/2006 |
| EP | 1 311 166 B1 | 9/2006 |
| EP | 1 390 126 B1 | 9/2006 |
| EP | 1389914 B1 | 9/2006 |
| EP | 1 613 172 B1 | 6/2007 |
| EP | 1 656 030 B1 | 1/2011 |
| GB | 1438533 A | 6/1976 |
| JP | 03-123426 A | 5/1991 |
| JP | 03-143351 A | 6/1991 |
| JP | 03-251143 A | 11/1991 |
| JP | 03-266921 A | 11/1991 |
| JP | 03-278817 A | 12/1991 |
| JP | 04-207157 A | 7/1992 |
| JP | 04-218758 A | 10/1992 |
| JP | 04-299952 A | 10/1992 |
| JP | 05-023072 A | 2/1993 |
| JP | 05-076280 A | 3/1993 |
| JP | 05-269353 A | 10/1993 |
| JP | 05-292880 A | 11/1993 |
| JP | 07-082296 A | 3/1995 |
| JP | 07-285885 A | 10/1995 |
| JP | 07039300 | 10/1995 |
| JP | 08-173031 A | 7/1996 |
| JP | 09-172962 A | 7/1997 |
| JP | 10-056962 A | 3/1998 |
| JP | 10-113122 A | 5/1998 |
| JP | 2000-102344 A | 4/2000 |
| JP | 2001-095487 A | 4/2001 |
| JP | 2002-000291 A | 1/2002 |
| JP | 2004-105048 A | 4/2004 |
| JP | 2004-510445 A | 4/2004 |
| JP | 2005-185151 A | 7/2005 |
| JP | 2005-245281 A | 9/2005 |
| JP | 2005-269925 A | 10/2005 |
| JP | 2005-336230 A | 12/2005 |
| WO | 87/06797 A1 | 11/1987 |
| WO | 1987/007954 A1 | 12/1987 |
| WO | 1989/001510 A1 | 2/1989 |
| WO | 1989/007154 A1 | 8/1989 |
| WO | 1989/011226 A1 | 11/1989 |
| WO | 1990/004414 A1 | 5/1990 |
| WO | 1990/007545 A2 | 7/1990 |
| WO | 1990/007575 A1 | 7/1990 |
| WO | 92/21245 A1 | 12/1992 |
| WO | 1993/004593 A1 | 3/1993 |
| WO | 1993/020713 A1 | 10/1993 |
| WO | 1994/013148 A1 | 6/1994 |
| WO | 1995/019714 A1 | 7/1995 |
| WO | 1996/035336 A1 | 11/1996 |
| WO | 1998/005760 A2 | 2/1998 |
| WO | 1998/146732 A1 | 10/1998 |
| WO | 1998/048640 A1 | 11/1998 |
| WO | 1999/037162 A1 | 7/1999 |
| WO | 00/64267 A1 | 11/2000 |
| WO | 2000/069548 A1 | 11/2000 |
| WO | 2001/001786 A2 | 1/2001 |
| WO | 2001/003515 A1 | 1/2001 |
| WO | 2001/030168 A1 | 5/2001 |
| WO | 2001/041580 A1 | 6/2001 |
| WO | 2001/083089 A1 | 11/2001 |
| WO | 2002/009527 A2 | 2/2002 |
| WO | 2002/019837 A1 | 3/2002 |
| WO | 2002/028194 A1 | 4/2002 |
| WO | 2002/30210 A1 | 4/2002 |
| WO | 2002/043937 A2 | 6/2002 |
| WO | 2002/069724 A1 | 9/2002 |
| WO | 2003/015902 A2 | 2/2003 |
| WO | 03/090545 A1 | 11/2003 |
| WO | 2004/076695 A1 | 9/2004 |
| WO | 2004/091306 A1 | 10/2004 |
| WO | 2004/094027 A2 | 11/2004 |
| WO | 2004/110158 A1 | 12/2004 |
| WO | 2005/039299 A2 | 5/2005 |
| WO | 2005/078078 A1 | 8/2005 |
| WO | 2006/012506 A1 | 2/2006 |
| WO | 2006/029298 A1 | 3/2006 |
| WO | 2006/043884 A1 | 4/2006 |
| WO | 2006/058083 A2 | 6/2006 |
| WO | 2006/089527 A1 | 8/2006 |
| WO | 2006/091167 A1 | 8/2006 |
| WO | 2006/096073 A1 | 9/2006 |
| WO | 2006/105405 A2 | 10/2006 |
| WO | 2008/077071 A1 | 6/2008 |
| WO | 2008/136671 A1 | 11/2008 |

OTHER PUBLICATIONS

"Sodium phosphate monobasic". Available online at https://www.sigmaaldrich.com/content/dam/sigma-aldrich/docs/Sigma-Aldrich/Product_Information_Sheet/s0751pis.pdf (Year: 2005).*

M. R. Bird and M. Bartlett, Modelling flux recovery during the chemical of microfiltration membranes fouled with whey protein concentrate (Abstract, 1 page).

L. Zander and Z. Zander, Monitoring of the continuous milk ultrafiltration process (Abstract, 1 page).

J. M. K. Timmer, Whey protein concentrates with non-traditional compositions?, European Dairy Magazine, (June), (3), 47-49 (Abstract, 1 page).

J. L. Maubois, Implications of microfiltration on hygiene and identity of dairy products: current uses and future perspectives of MF technology in the dairy industry (Abstract, 1 page).

R. Jost and P. Jelen, Implications of microfiltration on hygiene and identity of dairy products: cross-flow microfiltration—an extension of membrane processing of milk and whey (Abstract, 1 page).

A. Nielsen and J. Sprogo, Concentrate on quality, Dairy Industries International, (May), 62 (5), 21 and 23 (Abstract, 1 page).

P. Savello et al., Fouling of ceramic membrane by milk proteins during microfiltration, Australian Journal of Dairy Technology, (April), 52 (1), 60-62 (Abstract, 1 page).

C. Jung, The recovery of washing caustic from CIP waste water, European Dairy Magazine, (5), 32-33 (Abstract, 1 page).

Anonymous, Membrane filtration for the dairy industry, Deutsche Milchwirtschaft, 47 (15), 674-675 (Abstract, 1 page).

A. D. Marshall et al., Design and development of a cross-flow membrane rig to compare constant pressure and constant flux operation in ultrafiltration and microfiltration, Food and Bioproducts Processing, 74 (C2), 92-100 (Abstract, 1 page).

M. H. Nguyen, Australian developments in membrane processing of liquid foods, Food Australia, 48 (5), 232-233 (Absract, 1 page).

(56) References Cited

OTHER PUBLICATIONS

O. Surel and M. H. Famelhart, Ability of ceramic membranes to reject lipids of dairy products, Australian Journal of Dairy Technology, 50 (2), 36-40 (Abstract, 1 page).
G. Gesan and G. Daufin, Crossflow microfiltration of pretreated whey: fouling mechanism and operating procedure, Industries Alimentaires et Agricoles, 112 (9), 633-641 (Abstract, 1 page).
J. Short, Membrane separation in food processing (Abstract, 1 page).
M. Gautier et al., Partition of Lactococcus lactis bacteriophage during the concentration of micellar casein by tangential 0.1 micro metre pore size microfiltration, Lait, 74 (6), 419-423 (Abstract, 1 page).
Anonymous, Benchtop pilot hollow fiber ultrafiltration/microfiltration system processes 5 to 100+ liter volumes. (The new FiexStand 'Plus' benchtop pilot system from A/G Technology Corporation, US.), Dairy, Food and Environmental Sanitation, (July), 418 (Abstract, 1 page).
S. Mahe et al., 15N-labelling and preparation of milk, casein and whey proteins, Lait, 74 (4), 307-312 (Abstract, 1 page).
A. Pierre et al., Whey microfiltration performance: influence of protein concentration by ultrafiltration and of physico-chemical pretreatment, Lait, 74 (1), 65-77 (Abstract, 1 page).
W. J. Donnelly et al., Modification of milk protein functionality by new technologies for separation and hydrolysis (Abstract, 1 page).
J. J. Maugas and G. Daufin, Critical study of an industrial microfiltration and ultrafiltration plant for the production of high purity whey protein concentrates, Industries Alimentaires et Agricoles, 109 (10), 687-691 (Abstract, 1 page).
C. Honer, Membrane technology. Potential beyond imagination., Dairy Field, 175 (4), 60-62 (Abstract, 1 page).
R. J. Pearce et al., Reduction of lipids in whey protein concentrates by microfiltration—effect on functional properties (Abstract, 1 page).
P. H. Fergusson, Engineering innovation in the food industry—membrane processing in the food and dairy industries (No Abstract available, 1 page).
U. Merin and G. Daufin, Crossflow microfiltration in the dairy industry: state-of-the-art, Lait, 70 (4), 281-291 (Abstract, 1 page).
J. D. Dziedak, Membrane separation technology offers processors unlimited potential, Food Technology, 44 (9), 108-113 (Abstract, 1 page).
M. Bennasar et al., Design and dimensions of industrial tangential filtration plants for concentrating and clarifying biological products, Industries Alimentaires et Agricoles, 106 (1/2), 43-49 (Abstract, 1 page).
F. Maynard et al., Fractionation of human lactoferrin and alpha lactalbumin using microfiltration and ultra filtration membranes, Lait, 69 (1), 59-69 (Abstract, 1 page).
J. Kinna, Cross flow filtration—a technique for concentration and separation of proteins, Internationale Zeitschrift fur Lebensmittel Technologie und Verfahrenstechnik, 40 (11), 644-648 (Abstract, 1 page).
Anonymous, CU researcher perfects treatment for whey protein concentrates, Dairy, Food and Environmental Sanitation, 9 (9), 506-507 (Abstract, 1 page).
K. H. Mohr and R. Schulze, Membrane separation processes in food technology and biotechnology (II), Lebensmittel Industrie, 35 (6), 244-249 (Abstract, 1 page).
J. Mans, Next generation membrane systems, Daily Foods, 89 (8), 62-68 (Abstract, 1 page).
Unknown, Survey on the "Inatec"—congress papers, Lebensmitteltechnik, 18 (b), 256-284 (Abstract, 1 page).
J. H. Hanemaaijer, Microfiltration in whey processing, Desalination, 53, 143-155 (No Abstract available, 1 page).
D. J. Paulson et al., Crossflow membrane technology and its applications, Food Technology, 38 (12), 77-87 and 111 (Abstract, 1 page).
W. Hoffmann et al., Enrichment of milk protein fractions by microfiltration, Kieler Milchwirtschaftliche Forschungsberichte, vol. 58 (1), 41-51, 2006 (Abstract, 1 page).
M. P. Bonisch et al., Inactivation of an indigenous transglutaminase inhibitor in milk serum by means of UHT-treatment and membrane separation techniques, International Dairy Journal, vol. 16 (6), 669-678, 2006 (Abstract, 1 page).
J. G. Brennan et al., Separations in food processing, Food Processing Handbook, 429-511, 2006, Wiiey-VCH Verlag GmbH & Co., Weinheim, Germany (Abstract, 1 page).
J. Kromkamp, Particle separation and fractionation by microfiltration, 184, 2005, Wageningen University, Wageningen, The Netherlands (Abstract, 1 page).
J. L. Maubois, Technological requirements of milk for dairy industry with particular reference to the potential adaptation for human nutrition and health, Animal Science Papers and Reports, vol. 22 (3), 401-403, 2004 (Abstract, 1 page).
Y. Ma and D. M. Barbano, Serum protein and casein concentration: effect on pH and freezing point of milk with added $CO_2$, Journal of Daily Science, vol. 86 (5), 1590-1600, 2003 (Abstract, 1 page).
C. M. Michalski, Milkfat globules: physico-chemical properties as a function of size, Bulletin of the International Dairy Federation, (389), 104-107, 2004 (Abstract, 1 page).
M. Kersten and J. Hinrichs, "Native" casein concentrates after microfiltration, Deutsche Milchwirtschaft, vol. 51 (7), 312-315, 2000 (Abstract, 1 page).
P. M. Kelly, Extended shelflife (ESL) milk around the corner from your doorstep!, Farm & Food, vol. 9 (1), 30-33, 1999 (Abstract, 1 page).
U. Hulsen, Market milk with extended shelf life: technical production possibilities, Deutsche Milchwirtschaft, vol. 50 (14), 588-591, 1999 (Abstract, 1 page).
G. Gesan-Guiziou et al., Process steps for the preparation of purified fractions of alpha-lactalbumin and beta-lactoglobulin from whey protein concentrates, Journal of Daly Research, vol. 66 (2), 225-236, 1999 (Abstract, 1 page).
S. Sachdeva and W. Buchheim, Isolating phospholipid-protein aggregates from buttermilk using membrane separation technology, Wissenschaft, (469), 135-144, 1998 (Abstract, 1 page).
P. Schkoda and H. G. Kessler, Innovation by means of membrane separation processes, Deutsche Milchwirtschaft, vol. 48 (12), 445-446, 1997 (Abstract, 1 page).
D. K. Sharma, Microfiltration and its applications in dairy industry, Indian Dairyman, vol. 50 (5), 33-36, 1998 (Abstract, 1 page).
J. L. Maubois, Recent developments in membrane technologies, Latte, vol. 22 (10), 186-191, 1997 (Abstract, 1 page).
A. Caron et al., Coagulation of milk enriched with ultrafiltered or diafiltered microfiltered milk retentate powders, International Dairy Journal, vol. 7 (6/7), 445-451, 1997 (Abstract, 1 page).
R. Jost and P. Jelen, Cross-flow microfiltration—an extension of membrane processing of milk and whey, Bulletin of the International Dairy Federation, (320), 9-15, 1997 (Abstract, 1 page).
A. Nielsen and J. Sprogo, Powdered whey protein concentrate, Danish Dairy & Food Industry . . . Worldwide, vol. 10, 72-73, 1996 (Abstract, 1 page).
M. Parmentier et al., Process for separation of an anhydrous fat into fractions with high and low melting points and device for implementing this process, French Patent Application FR 2 713 656 A1, p. 13, 1995 (Abstract, 1 page).
M. Britten and Y. Pouliot, Characterization of whey protein isolate obtained from milk microfiltration permeate, Lait, vol. 76 (3), 255-265, 1996 (Abstract, 1 page).
R. K. Singh and S. S. H. Rizvi, Bioseparation processes in foods, Conference Proceedings ITF Basic Symposium Series 10, pp. viii and 469, 1995, Marcel Dekker Inc., New York, New York (Abstract, 1 page).
D. Karleskind et al., Chemical pretreatment and microfiltration for making delipidized whey protein concentrate, Journal of Food Science, vol. 60 (2), 221-226, 1995 (Abstract, 1 page).
D. Karleskind et al., Gelation properties of lipid-reduced, and calcium-reduced whey protein concentrates, Journal of Food Science, vol. 60 (4), 731-737 and 741, 1995 (Abstract, 1 page).

(56) References Cited

OTHER PUBLICATIONS

K. H. Mohr and R. Schulze, Membrane separation processes in food engineering and biotechnology. II., Lebensmittelindustrie (Berlin), vol. 35 (6), 244-249, 1988 (Abstract, 1 page).

J. C. Rinn et al., Evaluation of nine semi-pilot scale whey pretreatment modifications for producing whey protein concentrate, Journal of Food Science, vol. 55 (2), 510-515, 1990 (Abstract, 1 page).

H. K. Wilson and E. O. Herreid, Controlling oxidized flavours in high-fat sterilized creams, Journal of Dairy Science, 1969, 52 (8),1229-32, Abstract from DIALOG(R) File 51: Food Sci. & Tech. Abs, 1 page.

D. M. Santos et al., Sandiness and other problems in doce de leite, Boletim do Instituto de Tecnologia de Alimentos, 1977, (52), 61-80, Abstract from DIALOG(R) File 50: CAB Abstracts, 1 page.

A. W. Sweetsur and D. D. Muir, The use of permitted additives and heat treatment to optimise the heat stability of skimmed milk and concentrated skim milk, Journal of the Society of Dairy Technology, 1980, 33 (3), 101-5, Abstract from DIALOG(R) File 53: FOODLINE(R): Science, 1 page.

A. W. M. Sweetsur and D. D. Muir, Natural variation in heat stability of concentrated milk before and after homogenization, Journal of the Society of Dairy Techhnology, 1982, vol. 35 (4), 120-126, Abstract from DIALOG(R) File 50: CAB Abstracts, 1 page.

A. W. M. Sweetsur and D. D. Muir, Manipulation of the heat stability of homogenised concentrated milk, Journal of the Society of Dairy Technology, 1982, vol. 35 (4), 126-32, Abstract from DIALOG(R) File 53: FOODLINE(R): Science, 1 page.

E. R. B. Graham, The effect of different factors on the viscosity of concentrated milk, XXI International Dairy Congress, 1982, vol. 1, Book 2, p. 45, Abstract from DIALOG(R) File 50: CAB Abstracts, 1 page.

D. D. Muir, The influence of some inorganic salts on the heat stability of 40% solids concentrated skim milk, XXI International Dairy Concgress, 1982, vol. 1, Book 2, p. 86, Abstract from DIALOG(R) File 50: CAB Abstracts, 1 page.

J. S. Sindhu, Influence of sodium phosphate on the heat stability of buffalo milk and its concentrate, Journal of Food Processing and Preservation, 1985, 9 (2), 57-64, Abstract from DIALOG(R) File 51: Food Sci. & Tech. Abs, 1 page.

J. A. Blais et al., Concentrated milks and milk powder, Presses de L'Universite Laval, 1985, 280-314, Abstract from DIALOG(R) File 53: FOODLINE(R): Science, 1 page.

J. S. Sindhu and M. Tayal, Influence of stabilizers on the salt balance of pH of buffalo milk and its concentrate, Journal of Food Technology, 1986, 21 (3), 331-7, Abstract from DIALOG(R) File 53: FOODLINE(R): Science, 1 page.

J. A. Nieuwenhuijse et al., Calcium and phosphate partitions during the manufacture of sterilized concentrated milk and their relations to the heat stability, Netherlands Milk and Dairy Journal, 1988, 42 (4), 387-421, Abstract from DIALOG(R) File 51: Food Sci. & Tech. Abs, 1 page.

J. A. Nieuwenhuijse, Heat stability of concentrated skim milk, Netherlands Milk and Dairy Journal, 1993, 47 (1), 51-53, Abstract from DIALOG(R) File 53: FOODLINE(R): Science, 1 page.

J. E. Schraml et al., Effects of composition and concentration of dairy liquids on fouling structure, Milchwissenchaft, 1996, 51 (11), 607-611, Abstract from DIALOG(R) File 53: FOODLINE(R): Science, 1 page.

Athina Tziboula et al., Microfiltration of milk with ceramic membranes: Influence on casein composition and heat stability, Milchwissenschaft, 53 (1) 1998 pp. 8-11.

E. Mann, Recombined milk, Dairy Industries International, Feb. 2001, 66 (2), 15-16, Abstract from DIALOG(R) File 53: FOODLINE(R): Science, 1 page.

R. Mizuno and J. A. Lucey, Effects of emulsifying salts on the turbidity and calcium-phosphate-protein interactions in casein micelles, Journal of Dairy Science, Sep. 2005, 88 (9) 3070-3078, Abstract from DIALOG(R) File 53: FOODLINE(R): Science, 1 page.

Japan Patent Office, Official Notice of Rejection for Japanese Patent Application No. 2007-522798 dated Dec. 22, 2009 with English Translation, 6 pages.

Venkatachalam et al., Effect of lactose concentration on age gelation of UHT sterilized skim milk concentrate Journal of Dairy Science, 74 (Aug. 1991) pp. 12-15, 1 page.

Hinrichs et al., Ultrahocherhitzen von Milchkonzentraten, Deutsche Miichwirtschaft, 48 (1997) pp. 185-188.

Datta et al., Age Gelation of UHT Milk—A Review, Trans IChemE, 79 {Dec. 2001) pp. 197-210.

Udabage et al., Effects of Mineral Salts and Calcium Chelating Agents on the Gelation of Renneted Skim Milk, J. Dairy Sci., 84 {2001) pp. 1569-1575.

Cano-Ruiz et al., Changes in Physicochemical Properties of Retort-Sterilized Dairy Beverages During Storage, J. Dairy Sci. 81 (1998) pp. 2116-2123.

El-Din et al., Polymerization of Casein on Heating Milk, Int. Dairy Journal, 3 (1993) pp. 581-588.

McMahon et al., Effects of Phosphate and Citrate on the Gelation Properties of Casein Micelles in Renneted Ultra-High Temperature (UHT) Sterilized Concentrated Milk, Food Structure, 10 (1991) pp. 27-36.

Harwalkar et al., Effect of added Phosphates and storage on changes in ultra-high temperature short-time sterilized concentrated skim-milk. 1. Viscosity, gelation, alcohol stability, chemical and electrophoretic analysis of proteins, Neth. Milk Dairy J., 32 (1978) pp. 94-111.

Jay, High Temperature Food Preservation and Characteristics of Thermophillic Microorganisms, Modern Food Microbiology, ch.16, (1998) NY, Aspen Publishers, pp. 347-369.

Sweetsur A W Metal., Optimization of the heat stability of concentrated milks prepared by ultrafiltration, Milchwissenschaft, 40, No. 6 (1985) pp. 334-337.

Sweetsur A W Metal., Effect of concentration by ultrafiltration on the heat stability of skim-milk, Journal of Dairy Research, 47, No. 3 (1980) pp. 327-335.

DeMan, Principles of Food Chemistry, 3rd Ed. 1999, p. 272.

Fundamentals of Dairy Chemistry, 3rd Ed. Chapter 2, p. 43.

G. Solanki and S. S. H. Rizvi, "Physico-Chemical Properties of Skim Milk Retentates from Microfiltration," Journal of Daisy Science, vol. 84, No. 11, Nov. 2001, pp. 2381-2391.

European Patent Office Extended European Search Report for European Application No. 09167573.6 dated May 3, 2011 (14 pages).

Gebhardt and Thomas. "Nutritive Value of Foods"—USDA Agricultural Research Service, Home and Garden Bulletin No. 72. Oct. 2002. pp. 18-20.

European Patent Office Extended European Search Report for European Application No. 09252557.5 dated May 3, 2011 (10 pages).

B. K. Nelson and D. M. Barbano, "A Microfiltration Process to Maximize Removal of Serum Proteins from Skim Milk Before Cheese Making," Journal of Dairy Science, vol. 88, No. 5, May 2005, pp. 1891-1900.

International Search Report, PCT/US2011/050847 dated Jun. 20, 2013, 5 pages.

Muir et al., "Preparation and properties of a new generation of in-can sterilized skim-milk based concentrated", Journal of Food Technology (1984) 19, 269-379.

D.D. Muir and A.W.M. Sweetsur, "Production and properties of in-can sterilized concentrated milk with 39% solids process optimization," Milchwisserschalt 27(z) 1992, 80-83.

M. Girones I Nogue et al., Vibrating polymeric microsieves: antifouling strategies for microfiltration, Journal of Membrane Science, 285 (1,2), 323-333, 2006 (Abstract, 1 page).

J. Kromkamp et al., Differential analysis of deposition layers from micellar casein and milk fat globule suspensions onto ultrafiltration and microfiltration membranes, Journal of Food Engineering, 80 (1), 257-266, 2007 (Abstract, 1 page).

M. C. Michalski et al., Microfiltration of raw whole milk to select fractions with different fat globule size distributions: process optimization and analysis, Journal of Dairy Science, 89 (10), 3778-3790, 2006 (Abstract, 1 page).

(56) References Cited

OTHER PUBLICATIONS

P. Morin et al., A comparative study of the fractionation of regular buttermilk and whey buttermilk by microfiltration, Journal of Food Engineering, 77 (3, Special Section: CHISA 2004), 379-471, 2006 (Abstract, 1 page).
I. Drgalic and L. Tratnik, Application and effects of microfiltration in the dairy industry, Mljekarstvo, 54 (3), 225-245, 2004 (Abstract, 1 page).
R. R. Roesch, et al., Emulsifying properties of fractions prepared from commercial buttermilk by microfiltration, Journal of Dairy Science, 87 (12), 4080-4087, 2004 (Abstract, 1 page).
Kentish Vivekanand et al., Microfiltration offers environmentally friendly fractionation of milk proteins, Australian Journal of Dairy Technology, 59 (2), 186-188, 2004 (Abstract, 1 page).
P. Blanpain-Avet et al., The effect of multiple fouling and cleaning cycles on a tubular ceramic microfiltration membrane fouled with a whey protein concentrate. Membrane performance and cleaning efficiency, Food & Bioproducts Processing, 82 (C3), 231-243, 2004 (Abstract, 1 page).
D. M. Krstic et al., Static turbulence promoter in cross-flow microfiltration of skim milk, Desalination, 163 (1, 2, 3), 297-309, 2004 (Abstract, 1 page).
M. Corredig et al., Production of a novel ingredient from buttermilk, Journal of Dairy Science, 86 (9), 2744-2750, 2003 (Abstract, 1 page).
V. Mahesh Kumar and S. V. Anand, Potential applications of microfiltration in the dairy industry, Indian Food Industry, 22 (3), 58-62, 2003 (Abstract, 1 page).
J. C. Astaire et al., Concentration of polar MFGM lipids from buttermilk by microfiltration and supercritical fluid extraction, Journal of Dairy Science, 86 (7), 2297-2307, 2003 (Abstract, 1 page).
J. L. Maubois, Membrane microfiltration: a tool for a new approach in dairy technology, Australian Journal of Dairy Technology, 57 (2), 92-96, 2002 (Abstract, 1 page).
P. K. Vadi and S. S. H. Rizvi, Experimental evaluation of a uniform transmembrane pressure crossflow microfiltration unit for the concentration of micellar casein from skim milk, Journal of Membrane Science, 189 (1), 69-82, 2001 (Abstract, 1 page).
M. R. Bird and M. Bartlett, Measuring and modelling flux recovery during the chemical cleaning of MF membranes for the processing of whey protein concentrate, Journal of Food Engineering, 53 (2), 143-152, 2002 (Abstract, 1 page).
G. Solanki and S. S. H. Rizvi, Physico-chemical properties of skim milk retentates from microfiltration, Journal of Dairy Science, 84 (11), 2381-2391, 2001 (Abstract, 1 page).
T. Ishii et al., The liquid-state 31P-nuclear magnetic resonance study on microfiltrated milk, Journal of Dairy Science, 84 (11), 2357-2363, 2001 (Abstract, 1 page).
Chaturvedi Saumya et al., Studies on microfiltration as a method of de-lipidization of whey for production of whey protein concentrate, Journal of Food Science & Technology, India, 38 (2), 161-164, 2001 (Abstract, 1 page).
TIA—Techniques Industrielles Appliquees, Recent developments and applications in membrane processes, Industries Alimentaires et Agricoies, 117 (4), 19-22, 2000 (Abstract, 1 page).
L. V. Saboya and J. L. Maubois, Current developments of microfiltration technology in the dairy industry, Lait, 80 (6), 541-553, 2000 (Abstract, 1 page).
T. Bacher and P. Konigsfeldt, WPI by microfiltration of skim milk, European Dairy Magazine, 5, 14-16, 2000 (Abstract, 1 page).
Min Wang et al., The preliminary experiment of microfiltration for the removal of microorganisms in raw milk, China Dairy Industry, 28 (2), 13-14, 2000 (Abstract, 1 page).
D. L. Hekken and V. H. Van Holsinger, Use of cold microfiltration to produce unique beta-casein enriched milk gels, Lait, 80 (1), 69-76, 2000 (Abstract, 1 page).
G. Gesan-Guiziou et al., Critical stability conditions in skimmed milk crossflow microfiltration: impact on operating modes, Lait, 80 (1), 129-138, 2000 (Abstract, 1 page).

H. Goudedranche et al., Fractionation of globular milk fat by membrane microfiltration, Lait, 80 (1), 93-98, 2000 (Abstract, 1 page).
U. Huelsen, Alternative heat treatment processes, European Dairy Magazine, 3, 20-24, 1999 (Abstract, 1 page).
A. Makardij et al., Microfiltration and ultrafiltration of milk: some aspects of fouling and cleaning, Food & Bioproducts Processing, 77 (C2), 107-113, 1999 (Abstract, 1 page).
G. Gesan-Guiziou et al., Critical stability conditions in crossflow filtration of skimmed milk: transition to irreversible deposition, Journal of Membrane Science, 158 (1, 2), 211-222, 1999 (Abstract, 1 page).
G. Gesan-Guiziou et al., Wall shear stress: effective parameter for the characterisation of the cross-flow transport in turbulent regime during skimmed milk microfiltration, Lait, 79 (3), 347-354, 1999 (Abstract, 1 page).
O. Le Berre and G. Daufin, Microfiltration (0.1 mum) of milk: effect of protein size and charge, Journal of Dairy Research, 65 (3), 443-455, 1998 (Abstract, 1 page).
A. Guerra et al., Low cross-flow velocity microfiltration of skim milk for removal of bacterial spores, International Dairy Journal, 7 (12), 849-861, 1997 (Abstract, 1 page).
J. L. Maubois, Current uses and future perspectives of MF technology in the daily industry, Bulletin of the International Daily Federation, 320, 37-40, 1997 (Abstract, 1 page).
P. M. Kelly and J. J. Tuohy, The effectiveness of microfiltration for the removal of microorganisms, Bulletin of the International Daily Federation, 320, 26-31, 1997 (Abstract, 1 page).
S. Sachdeva and W. Buchheim, Separation of native casein and whey proteins during crossflow microfiltration of skim milk, Australian Journal of Dairy Technology, 52 (2), 92-97, 1997 (Abstract, 1 page).
G. Samuelsson et al., Rennet coagulation of heat-treated retentate from crossflow microfiltration of skim milk, Milchwissenschaft, 52, (4), 187-192, 1997 (Abstract, 1 page).
W. Hoffmann et al., Use of microfiltration for the production of pasteurized milk with extended shelf life, Bulletin of the International Dairy Federation, 311, 45-46, 1996 (Abstract, 1 page).
I. Pafylias et al., Microfiltration of milk with ceramic membranes, Food Research International, 29 (2), 141-146, 1996 (Abstract, 1 page).
M. Pouliot et al., On the conventional cross-flow microfiltration of skim milk for the production of native phosphocaseinate, International Dairy Journal, 6 (1), 105-111, 1996 (Abstract, 1 page).
Y. S. Liu et al., Fractionation of skim milk by ceramic membranes. III. Separation of whey proteins and evaluation of their functionality, Journal of Dairy Science, 78 (1), 148, 1995 (Abstract, 1 page).
S. Singh et al., Fractionation of skim milk by ceramic membranes. II. Separation of caseins and evaluation of their functional properties, Journal of Dairy Science, 78 (1), 147, 1995 (Abstract, 1 page).
F. Sanchez-Diaz Lozano et al., Fractionation of skim milk by ceramic membranes. I. Separation of fat, Journal of Dairy Science, 78 (1), 147, 1995 (Abstract, 1 page).
G. Gesan et al., Microfiltration performance: physicochemical aspects of whey pretreatment, Journal of Dairy Research, 62 (2), 269-279, 1995 (Abstract, 1 page).
G. Gesan et al., Performance of an industrial cross-flow microfiltration plant for clarifying rennet whey, Netherlands Milk & Dairy Journal, 47 (3, 4), 121-135, 1993 (Abstract, 1 page).
A. Pierre et al., Whey microfiltration performance: influence of protein concentration by ultrafiltration and of physicochemical pretreatment, Lait, 74 (1), 65-77, 1994 (Abstract, 1 page).
Anonymous, Mechanical methods for reducing the number of microorganisms in milk: bactofugation and microfiltration, Revista Argentina de Lactologia, 4 (6), 65-68, 1992 (Abstract, 1 page).
C. V. Morr, Whey protein functionality: current status and the need for improved quality and functionality, Food Technology, 44 (4), 100, 102-104, 106, 108, 110, 112, 1990 (Abstract, 1 page).
R. Haeusl et al., Crossflow microfiltration in the dairy industry, Lebensmitteltechnik, 22 (11), 652-656, 658-661, 1990 (Abstract, 1 page).

(56) References Cited

OTHER PUBLICATIONS

N. Olesen and F. Jensen, Microfiltration. The influence of operation parameters on the process, Milchwissenschaft, 44 (8), 476-479, 1989 (Abstract, 1 page).

P. R. Heinemann, The problem of fouling in crossflow microfiltration, Dissertation Abstracts International, B. 49 (2), 1988 (Abstract, 1 page).

J. Fauquant et al., Microfiltration of milk using a mineral membrane, Technique Laitiere & Marketing, 1028, 21-23, 1988 (Abstract, 1 page).

M. Piot et al., Separation and bacterial purification of raw whole milk using cross-flow microfiltration membranes, Technique Laitiere & Marketing, 1016, 42-46, 1987 (Abstract, 1 page).

G. B. Tanny et al., Biotechnical applications of a pleated crossflow microfiltration module, Desalination, 41 (3), 299-312, 1982 (Abstract, 1 page).

W. Hoffmann et al., Processing of extended shelf life milk using microfiltration, International Journal of Dairy Technology, (November), 59 (4), 229-235 (Abstract, 1 page).

P. Morin et al., A comparative study of the fractionation of regular buttermilk and whey buttermilk by microfiltration, Journal of Food Engineering, (December), 77 (3), 521-528 (Abstract, 1 page).

J. L. Maubois and P. Shuck, Membrane technologies for the fractionation of dairy components, International Diary Federation (Abstract, 1 page).

M. Van Den Hark, Fractioning of milk to hand, Voedingsmiddelentechnologie (VMT), (Sep. 2), 38 (18-19), 12-13 (Abstract, 1 page).

G. Lal Baruah et al., Global model for optimizing crossflow microfiltration and ultrafiltration processes: a new predictive and design tool, Biotechnology Progress, (July-August), 21 (4), 1013-1025 (Abstract, 1 page).

C. Fauquant et al., Differently sized native milk fat globules separated by microfiltration: fatty acid composition of the milk fat globule membrane and triglyceride core, European Journal of Lipid Science and Technology, (February), 107 (2), 80-86 (Abstract, 1 page).

B. Kirschenmann, Applications of membrane technology in the dairy industry, Deutsche Miichwirtschaft, (September 1), 55 (18), 710-712 (Abstract, 1 page).

Advances in fractionation and separation: processes for novel dairy applications, International Dairy Federation (Abstract, 1 page).

P. Morin et al., Effect of temperature and pore size on the fractionation of fresh and reconstituted buttermilk by microfiltration, Journal of Dairy Science, (February), 87 (2), 267-273 (Abstract, 1 page).

V. M. Kumar and S. K. Anand, Potential applications of microfiltration in the dairy industry, Indian Food Industry, (May-June), 22 (3), 58-62 (Abstract, 1 page).

G. Lal Baruah et al., A predictive aggregate transport model for microfiltration of combined macromolecular solutions and polydisperse suspensions: testing model with transgenic goat milk, Biotechnology Progress, (September-October), 19 (5), 1533-1540 (Abstract, 1 page).

B. Ostergaard, Adding value to whey with Pro-Frac, European Dairy Magazine, (August), (4), 2023 (Abstract, 1 page).

Membrane filters, Tetra Pak, 2nd Revised Edition (Abstract, 1 page).

M. Moresi and S. Lo Presti, Present and potential applications of membrane processing in the food industry, Italian Journal of Food Science, 15 (1), 3-34 (Abstract, 1 page).

U. Kulozik and M. Kersen, New ways for the fractionation of dairy and minor constituents using UTP-membrane technology (Abstract, 1 page).

E. Cohen Maurel, Membrane separation of liquids, Process, (May), (1182), 42-48 (Abstract, 1 page).

R. P. Singh and D. R. Heldman, Membrane Separation, 3rd Edition (Abstract, 1 page).

G. Daufin and U. Merin, Fouling of inorganic membranes in filtration processes of dairy products (Abstract, 1 page).

H. C. Van Der Horst, Fouling of organic membranes during processing of dairy liquids (Abstract, 1 page).

A. D. Marshall and G. Daufin, Physico-chemical aspects of membrane fouling by dairy fluids (Abstract, 1 page).

L. Kindle, Choosing the right filtration application—dairy processing, Food Processing, Chicago, (August), 61 (8), 104-106 (Abstract, 1 page).

P. Czekaj et al., Membrane fouling by turbidity constituents of beer and wine: characterization and prevention by means of infrasonic pulsing, Journal of Food Engineering, (April), 49 (1), 25-36 (Abstract, 1 page).

H. K. Vyas et al., Influence of feed properties on membrane fouling in crossflow microfiltration of particulate suspensions, International Dairy Journal, 10 (12), 855-861 (Abstract, 1 page).

A. Sip and W. Grajek, The effect of culture medium sterilisation methods on divercin production yield in continuous fermentation (Abstract, 1 page).

G. Gesan Guiziou et al., Stability of crossflow microfiltration: recent advances in skimmed milk crossflow microfiltration (0.1 micrometres), Industries Alimentaires et Agricoles, (December), 117 (12), 3-19 (Abstract, 1 page).

Z. Puhan, Microfiltration and product innovations, Deutsche Miichwirtschaft, (Nov. 2), 51 (22), 950-951 (Abstract, 1 page).

T. Bacher and P. Konigsfeldt, WPI by microfiltration of skim milk, Scandinavian Dairy Information, (September), (3), 18-20 (Abstract, 1 page).

H. K. Vyas et al., Influence of operating conditions on membrane fouling in crossflow microfiltration of particulate suspensions, International Dairy Journal, (July), 10 (7), 477-487 (Abstract, 1 page).

K. Smith, Mechanics of membrane processing. Part 2., Dairy Pipeline, (Winter), 12 (1), 6-7 (Abstract, 1 page).

P. M. Kelly et al., Implementation of integrated membrane processes for pilot scale development of fractionated milk components, Lait, (January-February), 80 (1), 139-153 (Abstract, 1 page).

C. Kiesner et al., Manufacturing of alpha-lactalbumin-enriched whey systems by selective thermal treatment in combination with membrane processes, Lait, (January-February), 80 (1), 99-111 (Abstract, 1 page).

R. Lemoine, Trends in 2000. Advances in membrane technologies set to continue., Revue Laitiere Francaise, (December), (597), 31-33 (Abstract, 1 page).

P. Langley Danysz, Milk: flavour-rich fat globules, RIA, (December), (597), 42-43 (Abstract, 1 page).

P. Langley Danysz, Isolation of milk proteins and peptides, RIA, (September), (594), 48-50 (Abstract, 1 page).

U. Hulsen, Alternative methods of heat treatment, Deutsche Miichwirtschaft, (September), 50 (18), 774-779 (Abstract, 1 page).

N. K. Ottosen, Fractionation of milk proteins by microfiltration, Scandinavian Dairy Information, 13 (2), 24-25 (Abstract, 1 page).

M. Tomita, Membrane separation in dairy industry, Foods and Food Ingredients Journal of Japan, (181), 33-41 (Abstract, 1 page).

J. Neff, The finer points of filtration, Food Processing, Chicago, (March), 60 (3), 96-100 (Abstract, 1 page).

J. M. K. Timmer and H. C. Van Der Horst, Whey processing and separation technology: state-of-the-art and new developments (Abstract, 1 page).

B. Peacock, Opting fora longer life, Australian Dairy Foods, (February), 20 (4), 40-42 (Abstract, 1 page).

P. Russell, Adding value to liquid milk, Milk Industry International, 100 (11), 7-11 (Abstract, 1 page).

F. Morel, Milk of the year 2000, Process, (July-August), (1140), 66-73 (Abstract, 1 page).

M. Cheryan, Process design (Abstract, 1 page).

O. SUREL and M. H. Famelart, Separation of lipids through cross-flow microfiltration, Industries Alimentaires et Agricoles, (May), 115 (5), 20-24 (Abstract, 1 page).

M. Jevons, Separate and concentrate, (Dairy processing.), Daily Industries International, (August), 62 (8), 19-21 (Abstract, 1 page).

H. A. Diefes, Beyond skimming, Food Processing, Chicago, (October), 58 (10), 103-104 (Abstract, 1 page).

Z. E. H. Otten et al., Model suitable for optimizing processes and shortening development time. (Ultra- and microfiltration.), Voedingsmiddelentechnologie, (Nov. 20), (24), 11-13 (Abstract, 1 page).

(56) References Cited

OTHER PUBLICATIONS

Office Action dated Dec. 10, 2015 for Ukrainian Patent Application No. 201304221, English translation (3 pgs.).
Office Action dated Aug. 6, 2015 for Russian Patent Application No. 2013113111, English translation (3 pgs.).
Official Notice of Final Decision of Rejection dated Dec. 15, 2015 for Japanese Patent Application No. 2013-528286, English translation (4 pgs).
Examination Report dated Jan. 19, 2016 for European Application No. 11758312.0 (5 pgs.).

* cited by examiner

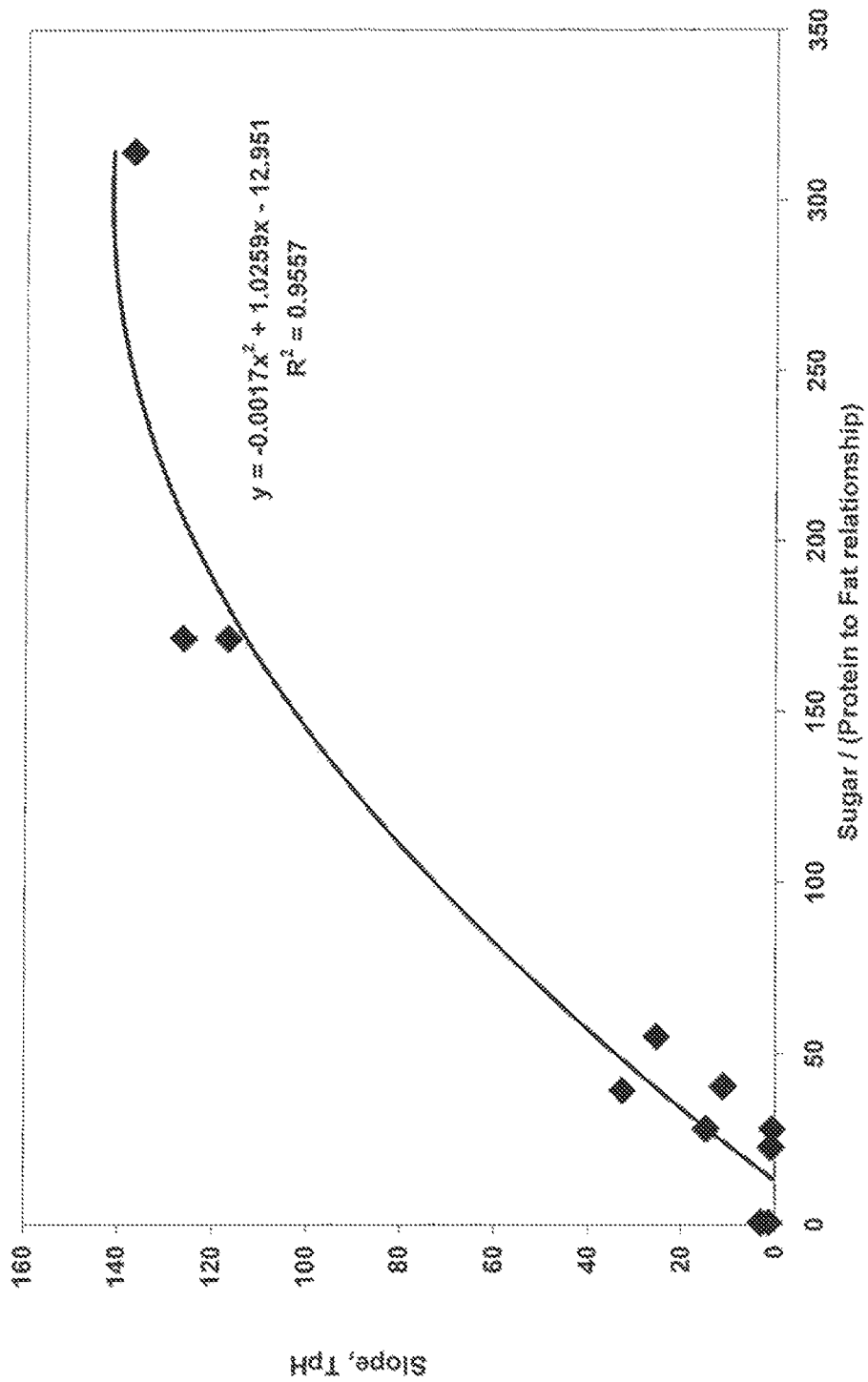

HIGH SOLIDS CONCENTRATED DAIRY LIQUIDS

CROSS-REFERENCE TO RELATED APPLICATIONS

This application is a U.S. national phase application of International Application No. PCT/US2011/050847, filed Sep. 8, 2011, designating the United States, which claims the benefit of U.S. Provisional Application Ser. No. 61/380,942, filed Sep. 8, 2010, the contents of both are incorporated herein by reference in their entirety.

FIELD

The field relates to high-solids concentrated dairy products, and more specifically, to non-gelling, non-browning, organoleptically pleasing, high-solids concentrated dairy products, such as concentrated milks having at least about 38 percent total solids, and methods for producing the same.

BACKGROUND

Liquid dairy products, such as milk, are generally thermally processed to increase their stability and to render them microbiologically safe. Unfortunately, thermal treating of milk can result in color changes, gelation, and the formation of off-flavor notes in some instances. For example, lactose in milk heated to high temperatures can interact with proteins and result in an unsightly brown color. This undesired condition is often referred to as browning or a Mallaird reaction. Gelation, on the other hand, is not completely understood, but the literature suggests that gels may form, under certain conditions, as a three-dimensional protein matrix formed by the whey proteins. See, e.g., Datta et al., "Age Gelation of UHT Milk—A Review," Trans. IChemE, Vol. 79, Part C, 197-210 (2001). Both gelation and browning are generally undesirable in milk since they impart objectionable organoleptic properties.

The concentration of milk is often desired because it allows for smaller quantities to be stored and transported, thereby resulting in decreased storage and shipping costs, and may allow for the packaging and use of milk in more efficient ways. However, the production of an organoleptically-pleasing, highly concentrated milk can be difficult, because the concentration of milk generates even more pronounced problems with gelation, browning, and also the formation of compounds imparting undesired flavor and off-notes. For instance, milk that has been concentrated to at least about 38 percent total solids has an even greater tendency to undergo protein gelation, fat flocculation, and browning during its thermal processing. Additionally, due to higher levels of protein in such highly concentrated milk, it may also have a greater tendency to separate and form gels over time as the product ages, thereby limiting the usable shelf life of the product.

A typical method of producing concentrated milk involves multiple heating steps in combination with the concentration of the milk. For example, one general method used to produce concentrated milk involves first standardizing the milk to a desired ratio of solids to fat and then forewarming the milk to reduce the risk of the milk casein coagulating during later sterilization. Forewarming also decreases the risk of coagulation taking place during storage prior to sterilization and may further decrease the initial microbial load. The forewarmed milk is then concentrated to the desired concentration. The milk may be homogenized, cooled, restandardized, and packaged. In addition, a stabilizer salt may be added to help reduce the risk of coagulation of the milk that may occur at high temperatures or during storage. Either before or after packaging, the product is sterilized. Sterilization usually involves either relatively low temperatures for relatively long periods of time (for example, about 90° C. to about 120° C. for about 5 to about 30 minutes) or relatively high temperatures for relatively short periods of time (for example, about 135° C. or higher for a few seconds). Processes to concentrate milk generally report shelf stability ranging from about 1 month to greater than about 6 months.

Various prior approaches for the production of concentrated milk describe the formation of dairy concentrates having varying levels of stability. However, such prior approaches are generally limited in the amount of total solids that form stable concentrates. Prior approaches to concentrate milk have generally met with limited success when attempting to concentrate to 38 percent or higher total solids. For example, US 2007/0172548 (Cale) describes a process of producing a concentrated milk with high levels of dairy proteins and low levels of lactose. Cale, however, describes concentrates and processes to produce such concentrates with up to 30 percent total solids.

US 2010/0104711 (Schmidt) describes a heat stable concentrated dairy liquid with a reduced dairy protein levels and increased fat content through a cream addition. The process and product of Schmidt describe stable concentrates having total solids up to about 36 percent. However, Schmidt notes that concentrates with higher levels of total solids at 38 percent fail and are not stable after retort sterilization.

US 2003/0054079 (Reaves) describes a method of producing an ultra-high temperature milk concentrate generally having 30 to 45 percent nonfat milk solids. That is, Reaves discloses a milk concentrate generally having 11 to 17 percent protein and 16 to 24 percent lactose (nonfat milk solids are generally about 37 percent protein and about 54 percent lactose). Reaves notes that such nonfat dairy solid levels are critical to the process and that lower nonfat milk solids will not produce acceptable results. Reaves describes preheating milk for 10 minutes at 65° C. (150° F.) to produce a preheated, milk starting product. The milk starting product is then pasteurized at 82° C. (180° F.) for 16 to 22 seconds and evaporated under elevated pasteurizing temperatures (i.e., 10 minutes at 62° C. (145° F.) under vacuum) to produce an intermediate, condensed liquid milk. The evaporation process used by Reaves will result in a condensed milk having the same relative amounts of protein and high levels of lactose as in the starting milk source. Cream and a stabilizer, such as sodium hexametaphosphate or carrageenan, are then added to the intermediate milk, which is then ultrapasteurized in two stages wherein the first stage is at 82° C. (180° F.) for 30 to 36 seconds and second stage is at 143° C. (290° F.) for 4 seconds. With such high lactose levels in the process and products of Reaves, it is expected that the concentrated milks of Reaves will undergo browning or Mallaird reactions during sterilization resulting in an undesired brownish color. In addition, Reaves describes high levels of dairy protein, which are also expected to result in a decreased level of stability in the absence of gums and certain other stabilizers.

BRIEF DESCRIPTION OF THE DRAWINGS

FIG. 4 is graph showing another exemplary relationship of total sugar relative to protein and fat with respect to LumiSizer phase separation rate.

DETAILED DESCRIPTION OF THE PREFERRED EMBODIMENTS

Figure 1:
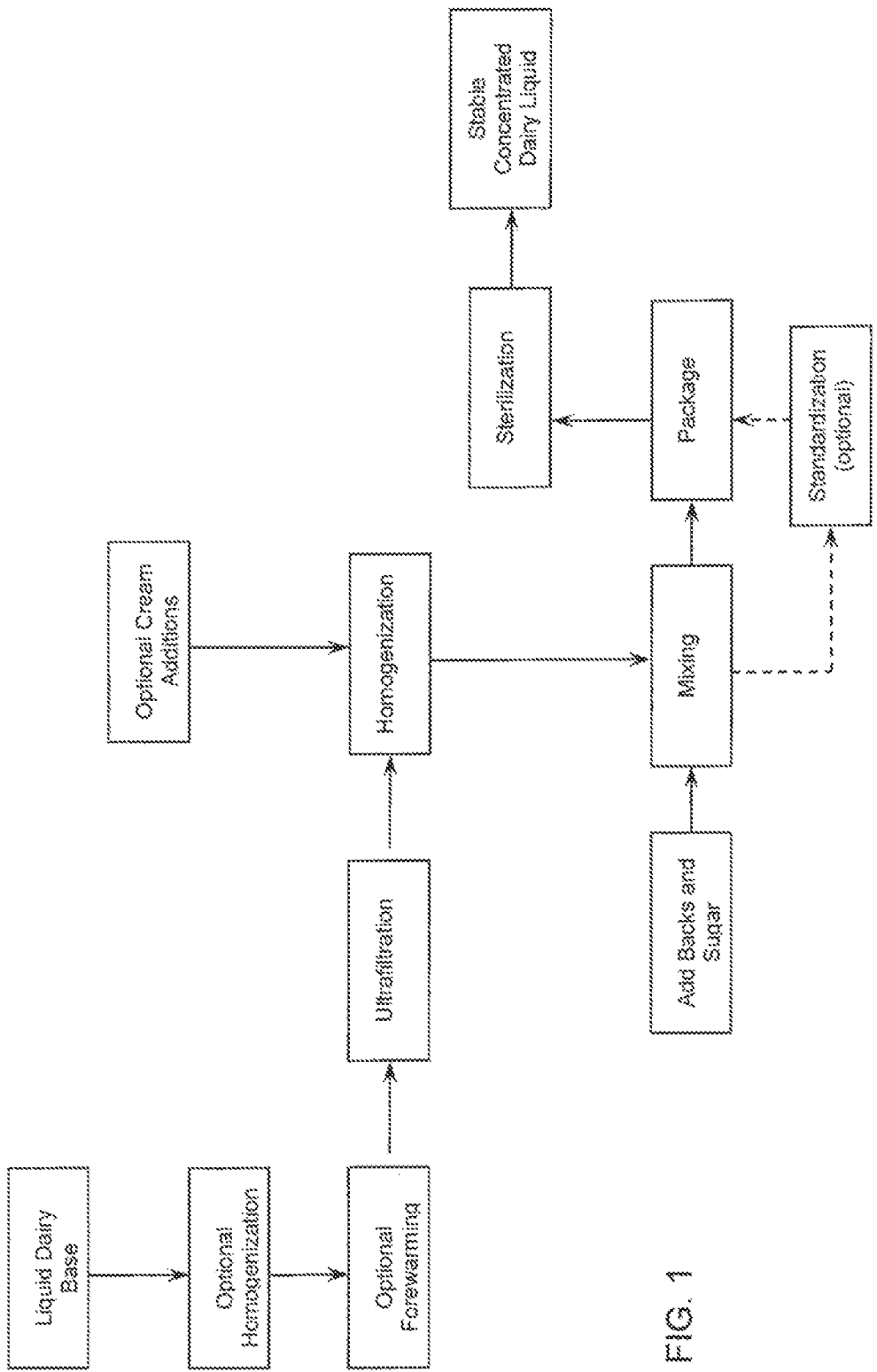
FIG. 1 is a flowchart of an exemplary method of forming a stable concentrated dairy liquid.

The methods and products disclosed herein relate to high solids concentrated dairy liquids that remain retort and shelf stable for an extended shelf life at ambient conditions with substantially no negative flavor notes typically found in the prior retorted dairy liquids. In one aspect, the stable concentrated dairy liquids have up to about 50 percent total solids, and in some approaches, between about 38 and about 50 percent total solids. In another aspect, the high solids concentrated dairy liquids may also include increased levels of sugar relative to the dairy solids and/or increased levels of sugar relative to the protein and fat to aid in achieving stability. In some approaches, the concentrates have up to about 30 percent, in other approaches, between about 10 and about 30 percent sugar, and in yet other approaches about 20 to about 30 percent sugar in order to render the high solids dairy concentrates stable after experiencing retort conditions and extended shelf storage. In still other aspects, the high solids concentrated dairy liquids herein may also include specifically defined ratios of sugar to dairy solids or sugar to protein and fat in order to effect a retort and shelf stable concentrate with such high levels of total solids.

In addition to such features, it has been discovered that dairy concentrates with such high levels of total solids and produced with the compositions and processes described herein also have a very slow phase separation rate, which is believed to be related to retort and/or shelf life stability. Phase separation rate as measured by percent transmission of near infrared light per hour (TpH), which is discussed more below, is a time-dependent separation behavior of the dairy concentrate that accounts for the interactions and synergies of formulation, dispersion effectiveness, and particle-to-particle interactions. In some approaches, the dairy concentrates herein with about 38 to about 50 percent total solids (in other cases, about 40 to about 50 percent and, in yet other cases, about 45 to about 50 percent total solids) exhibit a phase transmission rate of about 0.5 to about 33 TpH with a sugar to dairy solids ratio of about 1:1 to about 3.5:1 (i.e., FIG. 3 to be discussed more herein). In other approaches, the dairy concentrates herein with total solids of about 38 to about 50 percent (in other cases, about 40 to about 50 percent and, in yet other cases, about 45 to about 50 percent total solids) exhibit a decreasing phase transmission rate relative to an effective ratio of sugar to protein and fat (i.e., FIG. 4 to be discussed more below). In yet other approaches, the high solids dairy concentrates exhibit a phase transmission rate of about 10 TpH or below (in some cases about 4.5 TpH or below, and in other cases about 1.5 TpH or below) when the dairy concentrates have about 10 to about 30 percent sugar and a protein to buffering salt ratio of about 40 to about 60.

The concentrated dairy liquids can be used to create both hot and cold beverages such as by dilution. Beverages include, but are not limited to, coffee, tea, chocolate drinks, milk beverages, and the like. Examples further include latte, cappuccino, chai and similar drinks. By one approach, the concentrated dairy liquids may be suited for use with single-serve, on-demand beverage systems and may be provided within pods, cartridges, discs and the like for use therewith. The dairy liquids may also include optional flavors blended therein to provide flavored beverages.

In other aspects, the resultant stable concentrated dairy liquids herein may have reduced levels of protein, reduced levels of lactose, and increased amounts of fat relative to the protein via a cream addition and, as mentioned above, increased levels of sugar compared to the dairy solids, protein, and fat in order to achieve stability with such high levels of total solids. In some approaches, the concentrates may have a low protein to fat ratio of about 0.51 or below, a medium protein to fat ratio of about 0.51 to about 0.70, or a high protein to fat ratio of about 0.71 or greater. In other approaches, the concentrates may have reduced levels of lactose. By one approach, the lactose may range from about 0.25 to about 2 percent and, in other cases, about 0.5 to about 1.5 percent. Generally due to the relative amounts of sugar, protein, fat, and lactose, the disclosed concentrated dairy liquids herein exhibit enhanced dairy flavor profiles with substantially no off-notes or flavors even after sterilization heat treatments.

In some approaches, the concentrates have about 38 to about 50 percent total solids, in other approaches, about 40 to about 50 percent total solids, and in yet other approaches, about 45 to about 50 percent total solids. The concentrate may also include, in some approaches, about 11 or less percent total dairy protein, about 30 percent or less fat (about 15 percent or less in some approaches), about 10 to about 30 percent sucrose (about 20 to about 30 percent in other approaches), and up to about 50 percent total solids. The fat may be supplied from the combination of a starting liquid dairy base and through the addition of optional cream. The cream addition, if used, may occur at specified processing points during the concentration and thermal treatment process in order to form concentrated dairy liquids that remain stable during thermal processing and through an extended shelf life. For example, the cream addition, in one approach, occurs after concentration of the starting liquid dairy base, before homogenization, and before any other ingredients are added back into the process. In some cases, it has been discovered that varying the location, amounts, and/or form of cream addition may result in concentrates that may gel or separate after sterilization or after an extended shelf life.

The dairy liquids herein are generally resistant to gelation, fat flocculation, and browning during sterilization, and believed to be resistant to gelation, fat flocculation, phase separation, and/or browning for at least about 9 months of storage under ambient conditions (about 70° F. to about 75° F.). In particular, the concentrated dairy liquids made by the disclosed processes and formulations exhibit such stability and dairy flavors even when exposed to thermal processing sufficient to achieve a sterilization value ($F_o$) of at least about 5 minutes as required for commercial sterility and nominally up to about 13.5 minutes.

In general, the stable and organoleptically-pleasing dairy liquid is formed through a multi-step thermal and concentration process to achieve a desired sterilization value, product stability characteristics, and dairy flavor notes by decreasing the protein content, optionally increasing the fat content, increasing the sucrose level, reducing lactose, and achieving a highly stable phase separation rate. For instance, the method comprises forewarming, concentrating using ultrafiltration with or without diafiltration, blending optional cream prior to homogenization, adding stabilizers and other ingredients after homogenization, and sterilizing to provide an overall thermal treatment that produces the stable concentrated dairy liquid having a $F_o$ of at least about 5, preferably at least about 6.5, and more preferably at least about 7.5.

The degree of sterilization or the sterilization value ($F_o$) is based on the time that the dairy product is subjected to specific temperatures and is a culmination of all thermal treatments that the product encounters during processing. Consequently, a desired sterilization value may be achieved through a variety of processing conditions. Typically, concentrated milk is sterilized to a $F_o$ of at least about 5 and preferably to a much higher level (e.g., about 13 or higher).

The sterilization value for a sterilization process can be measured using graphical integration of time-temperature data during the food's slowest heating point rate curve for the thermal process. This graphical integration obtains the total lethality provided to the product. To calculate the processing time required to achieve a desired $F_o$ using the graphical method, a heat penetration curve (i.e., a graphical plot of temperature versus time) at the slowest heating location of the food is required. The heating plots are then subdivided into small time increments and the arithmetic mean temperature for each time increment is calculated and used to determine lethality (L) for each mean temperature using the formula:

$$L=10^{(T-121)/z}$$

Where:
T=arithmetic mean temperature for a small time increment in ° C.;
z=standardized value for the particular microorganism; and
L=lethality of a particular micro-organism at temperature T.
Next, the lethality value calculated above for each small time increment is multiplied by the time increment and then summed to obtain the sterilization value ($F_o$) using the formula:

$$F_o=(t_{T1})(L_1)+(t_{T2})(L_2)+(t_{T3})(L_3)+\ldots$$

Where:
$t_{T1}$, $t_{T2}$, . . . =Time increment at temperature T1, T2, . . . ;
$L_1$, $L_2$, . . . =Lethality value for time increment 1, time increment 2, . . . ; and
$F_o$=Sterilization value at 121° C. of a microorganism.
Consequently, once a penetration curve is generated, the sterilization value $F_o$ for the process can by computed by converting the length of process time at any temperature to an equivalent process time at a reference temperature of 121° C. (250° F.). The calculation of the sterilization value is generally described in Jay, 1998, "High Temperature Food Preservation and Characteristics of Thermophilic Microorganisms," in Modern Food Microbiology (D. R. Heldman, ed.), ch. 16, New York, Aspen Publishers, which is incorporated herein in its entirety.

The retort stability and/or the shelf life stability of the high solids concentrates described herein are believed to be an effect obtained from a unique combination of formulation and a synergistic or interconnected effect of various formulation components. This synergistic or interconnected effect may be related to and/or evidenced in high solids dairy concentrates by a very slow phase separation rate. By one approach, it is believed that dairy concentrates with a phase separation rates of about 10 percent transmission per hour or less (TpH), in other cases about 4 percent transmission per hour or less (TpH), and yet in other cases, about 1.5 TpH or less after concentration and retort are compositions with a high total solids formulation having the desired synergies and inter-relationships between formulation components that demonstrate acceptable shelf stabilities.

Turning to more of the specifics, the phase separation rate in terms of percent transmission per hour (or TpH for simplicity) is a measurement of a time dependent separation behavior of the dairy concentrate that takes into account the interactions and/or synergies of a wide variety of formulation, dispersion, and particle interactions. While not wishing to be limited by theory, it is believed that the phase separation rate may be related to the concentrate's particle size distribution, particle density distribution, complex particle-particle interactions, and/or solution viscosity with respect to the earth's gravitational forces. Although concentrated dispersions, such as concentrated milk systems, may separate in accordance to the Stokes relationship that governs the effect of drag forces on spherical particles with a velocity equal to $(\Delta\rho*d^2*g)/(18*\eta)$ in which $\Delta\rho$ is the density difference between particle and liquid, d is the particle diameter, g is the gravitational constant, and $\eta$ is the solvent viscosity. It is believed that the stability and phase separation rates of the highly concentrated dairy liquids herein (i.e., up to about 50 percent with about 20 to about 30 percent sugar in the relationships set forth herein) are further affected by complex particle-particle interactions that hinder and slow the separation rate beyond what normally would be expected due to gravity and Stokes law. The phase separation rate, as evidenced by TpH, takes into account the synergistic effects of a variety of fluid parameters as well as complex particle-to-particle interactions to identify highly stable concentrates that have very slow phase separation rates when at the high levels of total solids described herein.

By one approach, the phase separation rate may be measured on a LumiSizer (LUM GmbH, Berlin, Germany) that measures the percent transmission (% T) of near-infrared light along the length of the sample while the sample is spinning (up to 2350 times earth's gravity). While spinning, the particulate in the sample may accumulate both at the top (creaming) and/or bottom (pellet) depending on their densities, which is detectable by a decreasing % T (i.e., more opaque) at the top and bottom of the sample. Furthermore there may also be an increase in % T (i.e., clarification) in the region between top and bottom due to particle depletion. By integrating the % T of the sample from top to bottom, one can determine the overall separation rate or profile during the centrifugation time by plotting the integrated % T against time.

Figure 2:
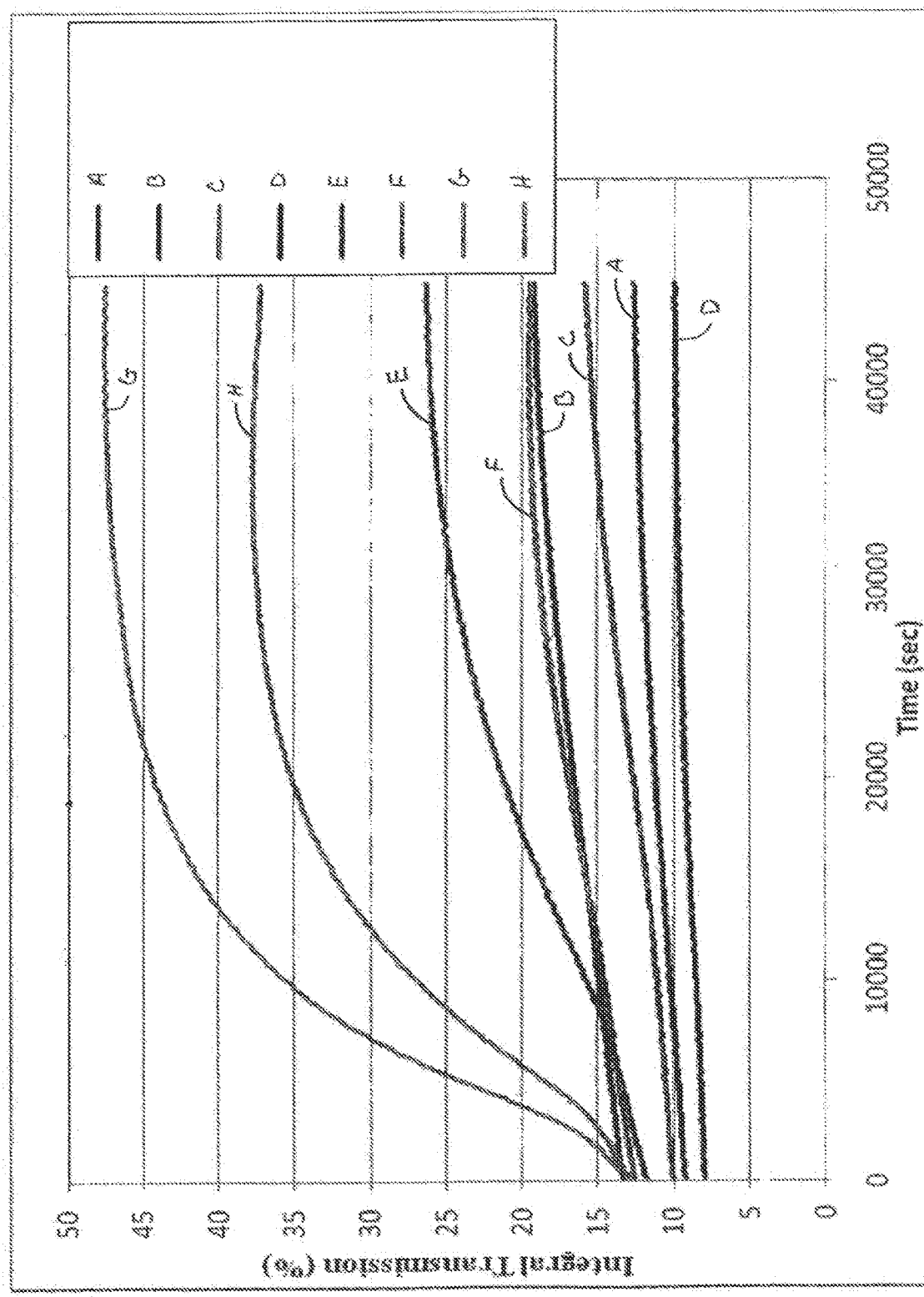
FIG. 2 is a graph of LumiSizer Data showing phase separation rate in percent transmission per hour (TpH) for various dairy concentrates.

By one approach, the LumiSizer test may be conducted by adding about 350 μL of sample (no dilution) to cuvettes (provided by LUM GmbH) and placed into the sample holder. The samples are then spun for approximately 44,000 seconds at about 25° C. at about 4,000 rpm (max speed at 2350× earth's gravity) while acquiring % transmission (% T) data every 3 minutes. At the conclusion of the run, the separation profiles (plotted as integrated % T vs. time) for each sample are analyzed in terms of their respective initial separation rates. In general, the initial separation rates of TpH may be measured from 0 to 5000 seconds, from 0 to 10,000 seconds, and/or from 5,000 to 10,000 seconds. Attached as Example 3 below is an illustration of the LumiSizer separation profiles and the TpH. FIG. 2 shows exemplary LumiSizer graph of various exemplary concentrates. As used herein, the phase transmission separation rate or TpH is the slope of the initial, linear portion of the separation rate curve and generally occurs between 0 and 5,000 seconds.

While not wishing to be limited by theory, the particle separation in the concentrated dairy liquids herein may occur in phases, for example, an initial slower phase followed by a more rapid separation phase that culminates into a final phase where there is no further change in the integrated % T. The initial phase is typically slower, which is believed due to the effect of particle-particle interactions impeding the separation rate of concentrated milk dispersions. It is believed that this initial phase of separation is most relevant to separation behavior of highly concentrated dispersions over shelf life. Over time as particles begin to accumulate at the top and bottom, the intervening particle concentration begins to decrease thus accelerating the separation rate, hence the subsequent and more rapid separation phase.

Based on the overall sedimentation behavior, it is believed that the initial slope values of % T versus time are relevant to stability. While not wishing to be limited by theory, within a particular composition formulation, a decreasing slope values indicate there is a larger barrier to separation, and thus more stable than those with larger slope values. The duration of this initial phase as part of the stability behavior may also be an important property. While not wishing to be limited by theory, a prolonged initial phase suggests a more stable dispersion, and conversely, a shorter initial phase suggests a less stable dispersion.

By one approach, for concentrates with about 38 to about 50 percent total solids to remain stable, it is believed they should include, in some approach, an effective amount of sugar relative to the amount of dairy solids. By one approach, such high solids concentrates may include a relationship of sugar to dairy solids ranging from about 1:1 to about 3.5:1 and a phase transmission separation rate of about 0.5 to about 33 TpH. Within this relationship, concentrates with the same level of dairy solids exhibit a decreasing separation rate as the amount of sugar relative to the dairy solids increases. By another approach, the concentrates with such high levels of total solids remain stable if they exhibit a complex relationship between sugar, protein, and fat levels evidenced by a ratio of the amount of sugar relative to a protein to fat relationship. For instance, stable high solids concentrates exhibit a phase transmission rate (or within +/−10 percent of the TpH) characterized by the formula TpH=−0.0017ratio$^2$−1.0259ratio−12.951 wherein the ratio is sugar/(protein to fat).

While not wishing to be limited by theory, it is believed that certain levels of sugar relative to the dairy solids, protein, and/or fat aid in the stability of the high solids dairy concentrates herein. As used herein, sugars may be sucrose and/or other additional sugars or sugar alcohols or polyols such as, but not restricted to, fructose, sorbitol, xylitol, erythritol or combinations thereof that can be used in full or as a partial sucrose replacement. Not being restricted by theory, it is believed that sugar or the sugar alcohols in combination with the other concentration components inhibits or reduces dairy protein aggregation through the replacement of protein surface water and the formation of more stable hydrogen bonds that decrease protein-protein interactions. Additionally, the sugar, which is solubilized in the concentrate, may provide a more viscous medium for slowing phase separation rates.

The concentrates herein also may have a brew recovery of greater than about 90 percent. Brew recovery is a measurement of the concentration of dairy liquid delivered from the concentrate after dilution by determining the amount of solids content delivered relative to the original solids in the concentrate. By one approach, brew recovery is determined by measuring the amount of solids loss after "brewing" or dilution of a concentrate contained in a cartridge designed for a single serve, on-demand beverage machine, such as the Tassimo brewer. After brewing, solids loss is determined by measuring the residual weight and percent solids of the concentrate remaining in the cartridge relative to the weight and solids of the original concentrate. Brew recovery is 100 minus the solids loss. Not only are the high solids concentrates herein highly stable as evidenced by a very slow phase separation rate, but they also have a brew recovery of greater than 90 percent.

Turning to more details of the concentrate, the high solids concentrates herein have about 40 to about 50 percent total solids and yet remain stable after retort and after experiencing a shelf life of about 9 months or more. By one approach, the concentrates have one or more of the characteristics in the table below. If cream is not added to the concentrates, then the range of dairy protein may be about 6 to about 11 percent and the range of dairy solids is about 10 to about 26 percent.

| Table of Stable high Solids Concentrates | | |
|---|---|---|
| Parameter | Min | Max |
| Total Solids | 38 | 50 |
| Dairy Solids | 10 | 30 |
| Dairy Protein | 1 | 11 |
| Sugar | 10 | 30 |
| Lactose | 0.25 | 2 |
| Protein-to-Fat | 0.07 | 56 |
| Protein Buffering Salt | 40 | 60 |
| Sugar to Dairy Solids | 1:1 | 3.5:1 |
| Sugar to (protein to fat) | 0.5 | 314 |
| Brew Recovery | 90% | |

Turning to more details of the concentration process, FIG. 1 illustrates a general method of the present concentration process to achieve a high solids concentrate employing increased sucrose contents, reduced protein levels, and (in some instances) specific cream additions to achieve a stable concentrated dairy liquid having enhanced dairy notes, a highly stable phase separation rate, and/or a high brew recovery rate. In this exemplary process, a liquid dairy base is provided, which may be optionally homogenized, and then forewarmed to a temperature and for a time effective in reducing soluble protein (as measured by pH 4.6 soluble protein). The forewarmed dairy liquid is then concentrated to the desired level, generally up to about 50 percent total solids (in some cases, about 38 to about 50 percent) using ultrafiltration-type techniques alone or combined with diafiltration techniques. If ultrafiltration is combined with diafiltration, the diafiltration is preferably carried during or after ultrafiltration. After the concentration step, an amount of optional cream is blended into the concentrated dairy liquid to form a cream enriched concentrated dairy liquid.

Next, the concentrated dairy liquid (optionally enriched with cream) is then homogenized as a combined fluid to form a homogenized cream enriched dairy liquid. At this point after homogenization, an effective amount of a stabilizer and other optional add backs (including the sugar) may then be mixed into the homogenized cream enriched concentrated dairy liquid to form a stabilized cream enriched dairy liquid. The stabilized cream enriched dairy liquid may optionally be standardized prior to packaging if so desired. After the addition of the stabilizer, the liquid is preferably packaged and sterilized at a time and temperature sufficient to achieve a $F_o$ greater than about 5. After sterilization, the resultant stable concentrated dairy liquid preferably includes about 11 percent or less total protein (in some cases, about 5 to about 10 percent protein), about 30 percent or less total fat (in some cases, about 9 to about 15 percent total fat), and less than about 2 percent lactose (in some cases, about 0.25 to about 1.5 percent). Preferred compositions may have a protein to fat ratio of about 0.4 to about 0.7. In some cases, the dairy liquid may have up to about 2.5 times as much fat as protein.

Stabilizers or buffering salts and other optional add-backs may then be blended into the homogenized cream enriched dairy liquid. As discussed in more detail below, at least a blends of stabilizers/buffering salts (such as, for example, about 0.2 to about 0.6 percent stabilizer including about 50 to about 25 percent disodium phosphate and about 50 to about 75 percent monosodium phosphate), at least one mouthfeel enhancer (for example, about 0.3 to about 0.6 percent sodium chloride), and optional additives (for example, about 0.04 to about 0.1 percent flavor and about 4 to about 23 percent sugar) can be mixed with the homogenized cream enriched dairy liquid.

The concentrates herein may be devoid of significant amounts of certain starches, gums, and emulsifiers. For example, the stable concentrated dairy liquids herein are preferably substantially free of starches, gums, and other emulsifiers such as carrageenan, monoglycerides, polyadloses (10-1-O or 10-1-CC, Lonza, Inc.), glycosperses (S-20 or O-20, Lonza, Inc.), lecithin, buttermilk, sodium caseinate, sodium hexametaphosphate, and the like. As used herein, substantially free of and not including significant amounts means less than about 0.5 percent, in some cases, less than about 0.1 percent, and in other cases, less than about 0.05 percent of each of or the combination of the starches, gums, and/or emulsifiers mentioned above.

The resulting product may then be packaged and sterilized (e.g., retorted) to achieve a $F_o$ of at least 5 and to provide the desired stable concentrated dairy liquid by heating, in one approach, to temperatures between about 250 and about 254° F. for about 5 to about 8.5 minutes. By one approach, the resultant stable concentrated dairy liquid has a composition of less than about 11 percent protein (in some cases, about 5 to about 10 percent protein), about 30 percent or less fat (in some cases, about 9 to about 15 percent fat), less than about 2 percent lactose, and about 38 to about 50 percent total solids. In some forms, the resultant product also has a protein-to-fat ratio of about 0.4 to about 0.75. The fat in the stable concentrated dairy liquid may be supplied from the combination of the fat provided in the starting liquid dairy base, which may or may not be subjected to ultrafiltration, and also the fat provided in the optional cream addition, which is not subjected to ultrafiltration or pre-homogenization.

In some approaches, dairy concentrates having a total dairy solids up to about 50 with a protein to fat ratio of about 0.72, about 20 to about 30 percent sugar, a 50/50 blend of monosodium phosphate (MSP) and disodium phosphate (DSP), and a protein to buffering salt (MSP+DSP) ratio from about 40 to about 60 were fluid after retort and had a very slow phase separation rate of about 10 TpH or less, in some cases, about 4.5 TpH or less, and in other cases about 1.5 TpH or less, which is consistent with a very stable dispersion. On the other hand, if the protein to buffering salt ratio is decreased below 40 or increased above 60, while the sample may be acceptable and fluid immediately after retort, such samples exhibited a low stability over its shelf life.

Additionally, in other approaches, if the dairy concentrates having a total solids up to about 50 percent total solids and a protein-to-fat ratio of about 0.72 used tri-sodium citrate for the buffering salt instead of the MSP and DSP along with a medium protein to buffering salt ratio of about 30 to about 60, then these samples gelled after retort and were unacceptable.

For purposes herein, "serum protein" generally refers to the protein content of milk plasma other than casein (i.e., serum protein generally refers to the whey protein content). "Milk plasma" generally refers to the portion of raw milk remaining after removal of the fat content. "Casein" generally encompasses casein per se (i.e., acid casein) or water soluble salts thereof, such as caseinates (e.g., calcium, sodium, or potassium caseinates, and combinations thereof). Casein amounts and percentages described herein are reported based on the total amount present of casein and caseinate (excluding the metal cation amount thereof). Casein generally relates to any, or all, of the phosphoproteins in milk, and to mixtures of any of them. An important characteristic of casein is that it forms micelles in naturally occurring milk. Many casein components have been identified, including, but not limited to, α-casein (including $α_{s1}$-casein and $α_{s2}$-casein), β-casein, γ-casein, κ-casein, and their genetic variants.

"Reduced fat" milk generally means about 2 percent fat milk. "Low fat" milk generally means about 1 percent fat milk. "Fat free milk" or "skim milk" both generally mean less than about 0.2 percent fat milk. "Whole milk" generally means not less than about 3.25 percent fat milk, and can be standardized or unstandardized. "Milk butter" generally means the residual product remaining after milk or cream has been made into butter and contains not less than about 3.25 percent fat. "Raw milk" generally means milk that has not yet been thermally processed. The milk or milk products used in the processes of the present invention can be standardized or non-standardized. The preferred milk is obtained from cows; however, other mammalian milk suitable for human consumption can be used if desired. "Cream" generally refers to a sweet cream, which is a cream or fat obtained from the separation of a whole milk. Preferred creams used herein have a fat content from about 32 to about 42 percent, about 3 to about 5 percent lactose, and less than about 2 percent protein.

"Shelf-life" or "shelf-stable" means the period of time at which a dairy product can be stored at about 70° F. to about 75° F. without developing an objectionable aroma, appearance, taste, consistency, mouthfeel or visible phase separation. In addition, an organoleptically acceptable dairy product at a given shelf life will have no off-odor, no off-flavor, and (in some approaches) no brown coloring. "Stable" or "shelf-stable" means that the dairy product at a given time does not have objectionable organoleptic characteristics as defined above and is organoleptically acceptable. Stable or shelf-stable also means a Brew Recovery of at least about 90 percent. Brew Recovery is a measurement of the dairy solids that are recovered in a cup as compared to the starting dairy solids when reconstituted at ambient conditions. For purposes herein, Brew Recovery was measured using a Tassimo Beverage Brewer and a standard Tassimo creamer T-Disc (Kraft Foods).

"Total milk solids" or "total solids" generally refers to the total of the fat and solid-not-fat (SNF) contents. "SNF"

generally refers to the total weight of the protein, lactose, minerals, acids, enzymes, and vitamins.

Essentially any liquid dairy base can be used in the present method. Preferably, the liquid dairy base originates from any lactating livestock animal whose milk is useful as a source of human food. Such livestock animals include, by way of non-limiting example, cows, buffalos, other ruminates, goats, sheep, and the like. Generally, however, cow's milk is preferred as the starting material. The milk used may be whole milk, low-fat milk, or skim milk. As the process targets a concentrated stable dairy liquid having an increased fat content, it is preferred to start with whole milk; however, the starting dairy source may also be skim or low-fat milk or cream as needed for a particular application with more or less cream additions as needed to obtain the target fat values.

Cow's milk contains lactose, fat, protein, minerals, and water, as well as smaller amounts of acids, enzymes, gases, and vitamins. Although many factors may affect the composition of raw cow's milk, it generally contains about 11 to about 15 percent total solids, about 2 to about 6 percent milk fat, about 3 to about 4 percent protein, about 4 to about 5 percent lactose, about 0.5 to about 1 percent minerals, and about 85 to about 89 percent water. Although milk contains many types of proteins, they generally can be grouped into the two general categories: casein proteins and serum proteins. The minerals, also known as milk salts or ash, generally include, as the major components, calcium, sodium, potassium, and magnesium; these cations can combine with phosphates, chlorides, and citrates in milk. Milk fat is mostly comprised of triglycerides, and smaller amounts of various other lipids. Lactose or milk sugar (4-O-$\beta$-D-galactopyranosyl-D-glucose) is a reducible disaccharide present in raw milk.

Turning to more of the details on the process, each process step will now be discussed in more detail. To begin with, the liquid dairy base, which is preferably whole milk, may be initially forewarmed or preheated as an optional step. Forewarming can be accomplished using any method or equipment known in the art (such as, for example, jacketed reactors, heat exchangers, and the like) to achieve the desired temperatures. Not wishing to be limited by theory, it is believed that forewarming initially crosslinks the serum or whey proteins to the casein micelles present in the milk; most crosslinking is likely to occur to the outer surfaces of the micelles. Such crosslinking will reduce the amount of soluble protein. Again, not wishing to be limited by theory, forewarming may also allow the whey proteins to interact covalently and/or hydrophobically with the micelles and especially with the outer surfaces of the micelles. Again, not wishing to be limited by theory, it is further believed that these interactions generally accomplish at least two effects. First, the interaction removes many of the whey proteins from solution; this effect may be important because the whey proteins are very reactive at high temperatures, such as those experienced in sterilization. Secondly, as the casein micelles become coated with serum or whey proteins, casein-casein interactions should be reduced and/or minimized; this effect should reduce the tendency of thermally-induced milk gels to form.

As noted, crosslinking during forewarming decreases the amount of soluble protein. The amount of soluble protein can be determined by acid precipitation followed by liquid chromatography coupled with UV detector (LC-UV). Comparison is made between forewarmed or heat processed samples and non-heat treated samples to quantify soluble protein fractions. The reduction in pH 4.6 soluble protein should be at least about 70 percent, preferably about 70 to about 100 percent, and more preferably about 70 to about 90 percent. Reductions in soluble protein are measured as pH 4.6 soluble protein, which is preferably in a method specific for the quantization of $\alpha$-lactalbumin and $\beta$-lactoglobulin serum proteins based on the methodologies published in J. Agric. Food Chem. 1996, 44, 3955-3959 and Int. J. Food Sci. Tech. 2000, 35, 193-200, which are both incorporated herein by reference.

The time and temperature of the forewarming step should be sufficient to obtain the desired reduction of pH 4.6 soluble protein while maintaining the desired stability of the liquid milk product during sterilization and subsequent storage. Of course, other parameters, in addition to the forewarming conditions, may affect stability during sterilization and subsequent storage.

By one approach, the forewarming or preheating of the dairy liquid, if used, is generally undertaken at least about 60° C. for at least about 30 seconds to form a preheated dairy liquid having the reduced levels of pH 4.6 soluble protein. By other approaches, forewarming is conducted at about 70° F. to about 100° C. for about 0.5 to about 20 minutes. By even other approaches, the forewarming is conducted at about 85 to about 95° C. at about 2 to about 6 minutes. Other forewarming conditions may also be used so long as the desired degree of crosslinking (generally as measured by a reduction pH 4.6 soluble protein) and the desired stability of the final product is obtained. Of course, other forewarming conditions can be used so long as the desired stability is obtained. For example, a two-stage process comprising a first stage at about 80° C. to about 100° C. for about 2 to about 6 minutes followed by a second stage at about 100° C. to about 130° C. for about 1 to about 60 seconds can be used.

After the optional forewarming step, the dairy liquid is concentrated to the desired total solids level to form a concentrated dairy liquid retentate. Concentration may be completed by ultrafiltration with or without diafiltration. For purposes of the methods herein, ultrafiltration is considered to include other membrane concentrations methods such a microfiltration and nanofiltration. Examples of suitable methods involving microfiltration, ultrafiltration, and diafiltration to concentrate a dairy liquid are found in US. Patent Publication Number 2004/0067296 A1 (Apr. 8, 2004) to Loh, which is incorporated herein by reference.

By one approach, it is preferred to concentrate the dairy liquid to a total solids content of up to about 31 percent, a protein level of about 9 to about 16 percent, a fat level of about 11 to about 19 percent, and a lactose level of about 0.5 to about 1.5 percent (before add backs). Using ultrafiltration, a significant amount (generally at least about 40 percent and more preferably at least about 95 percent) of the lactose and minerals are removed during the concentration step.

The concentration step is carried out using ultrafiltration, preferably with diafiltration, using a membrane pore size large enough to permit a portion of the lactose and minerals to pass through the pores with water as the permeate, while the retentate includes essentially all the protein and fat content. For example, the preferred whole milk base can be subjected to a membrane separation treatment to separate a protein-enriched "retentate" from a lactose-enriched permeate. However, the type of milk processed according to the methods herein is not particularly limited, and may also includes, for example, skim milk, reduced fat milk, low fat milk, butter milk, and combinations thereof.

By one approach, the membrane filtration may include a molecular weight (MW) cut off of approximately about 10,000×) to about 20,000 Daltons using a porous polysulfone-type membrane and the like, about 35 to about 65 psig applied pressure, and a processing temperature of about 123° F. to about 140° F. (about 50° C. to about 60° C.). In one embodiment, lactose and minerals are uniformly distributed across the membrane and pass through the membrane in an about 50 percent separation ratio, and about 100 percent of the fat and protein are retained in the retentate. Diafiltration serves to keep the lactose concentration in the retentate below about 4 percent.

In some cases, an amount of cream may be blended into the concentrated dairy liquid retentate to increase the fat content and form a cream enriched concentrated dairy liquid. By one approach, about 3 to about 57 percent cream is blended with the concentrated dairy liquid retentate to increase the fat content. In one approach, the cream is a sweet cream having a total fat content of about 32 to about 42 percent but other types of cream may also be used depending on availability.

By other approaches, total solids may be up to about 50 percent when the starting liquid dairy base is whole milk, and about 3 to about 34 percent cream and about 20 to about 30 percent sugar is added to the concentrated dairy liquid retentate. Optionally, if the starting liquid dairy base is skim milk, then about 34 to about 57 percent cream is added to the concentrated dairy liquid retentate along with about 20 to about 30 percent sugar. If the starting liquid dairy base is 2% milk, then about 20 to about 46 percent cream is added to the concentrated dairy liquid retentate together with about 20 to about 30 percent sugar. In each instance, the optional cream and sugar are added in specific amounts to achieve the effective ratios and relationship set forth herein to achieve stability in such highly concentrated dairy products.

As mentioned above, if cream is added, it has been discovered that the cream addition point may affect the stability of the resultant dairy liquid after sterilization. By one approach, the amount of cream may be blended into the dairy liquid after concentration and before homogenization and also before the addition of the stabilizers and optional add-back ingredients. In general, it has been discovered that other cream addition points, such as prior to concentration or after homogenization, result in gelled and separated concentrates after sterilization.

By adding the cream prior to the concentration step (such as before the forewarming), then the cream would be subjected to the ultrafiltration membrane along with the liquid dairy base. In this manner, the ultrafiltration would likely strip minerals and other natural sugars from the cream.

In some approaches, the cream may not be pre-homogenized prior to blending with the concentrated dairy liquid retentate, but simply added in its native state. In some cases, pre-homogenizing the cream may result in concentrated beverages that either gelled or separated into two or more phases upon retorting. While not wishing to be limited by theory, it is believed that pre-homogenizing the cream produces a less stable emulsion because the cream generally has insufficient protein to further emulsify or reduce the native cream fat droplet size distribution. For example, it is believed there is an increased probability of producing flocs of fat droplets that may increase the rate of phase separation and/or retort gelation in the final product when the cream is first pre-homogenized. Therefore, it is preferable to reduce cream fat droplet size after its addition to the retentate where there is an abundance of protein for homogenization.

After concentration and optional chilling, the cream enriched concentrated dairy liquid is homogenized as a single liquid to form a homogenized cream enriched dairy liquid. By one approach, the homogenization may be performed in one or multiple stages. For instance, in one non-limiting approach, a first homogenization stage can be performed at about 1,500 to about 2,000 psi and a second stage at about 100 to about 300 psi in an industry standard homogenizer. The homogenate may be cooled if it will not be immediately conducted to a packaging operation. For example, the homogenate may be cooled as it flows through a regeneration and cooling section of a plate heat exchanger of a standard homogenizer. While not wishing to be limited by theory, it is believed that higher homogenization conditions do not result in acceptable beverages because the higher pressure homogenates will generally have larger numbers of smaller particles that will lead to a higher probability of their gelation due to higher collision frequency and subsequent linking of droplets together.

As discussed above, to obtain a stable concentrate, the cream is preferably added prior to the homogenization step. While not wishing to be limited by theory, it is believed that the added fat supplied by the cream requires homogenization to produce a fat particle to survive the sterilization process as well as an extended shelf life. As noted above, it is preferred that the cream is not pre-homogenized prior to being added to the retentate, but it is preferred that the cream is subjected to homogenization in combination with the retentate in order to enhance the final product stability. For example, it is believed that homogenization not only reduces the fat droplet size distribution from the cream to delay any post-retort separation, but it also likely coats each fat droplet with a protein interface that will allow all the fat droplets to behave more uniformly or consistently with the additives and subsequent retort conditions. Furthermore, cream homogenization in the retentate where there is an abundance of emulsifying proteins, will produce single fat droplets with minimal flocculation. Insufficient protein results in an increased tendency to produce flocculated droplets. Flocculated droplets are more likely to accelerate phase separation as well as gel formation during or after retort conditions.

After homogenization, effective amounts of a stabilizer may be added to the homogenized cream enriched dairy liquid. The stabilizer may be a chaotropic agent, a calcium-binding buffer, or other stabilizer which effectively binds calcium to prevent gelation or separation of the concentrated dairy liquid during storage. While not wishing to be limited by theory and as is detailed in U.S. Patent Publication Number 2004/0067296 A1 (Apr. 8, 2004), it is believed that the calcium-binding stabilizer prevents gelation or separation of the dairy liquid during any storage prior to the subsequent sterilization. In general, any buffer or chaotropic agent or stabilizer which binds calcium may be used. Examples of suitable calcium-binding buffers, stabilizers, and chaotropic agents include citrate and phosphate buffers, such as monosodium phosphate, disodium phosphate, dipotassium phosphate, disodium citrate, trisodium citrate, EDTA, and the like as well as mixtures thereof.

A preferred buffering salt or stabilizer is a blend of monosodium phosphate and disodium phosphate. An effective amount of this stabilizer blend generally depends on the specific dairy liquid used as the starting material, the concentration desired, the amounts of cream added, and the calcium binding capacity of the specific stabilizers used. However, in general, for the cream enriched concentrated dairy liquid, about 0.2 to about 0.6 percent stabilizer that includes about 25 to about 50 percent monosodium phosphate and about 75 to about 50 percent disodium phosphate are effective stabilizers for the cream enriched and concentrated dairy liquid. By one approach, a ratio of the monosodium phosphate to the disodium phosphate ranges from about 50:50 to about 75:25 to form a stable concentrate.

With the ultrafiltered whole milk and cream additions, stabilizer ratios outside of this range generally form gelled or separated concentrates after sterilization.

Other optional ingredients may also be included in the add backs. By one approach, mouthfeel enhancers, flavors, sugars, and other additives may also be added as needed for a particular application. For instance, about 10 to about 30 percent sugar (in some approaches, about 20 to about 30 percent sugar) is added to effect to ratios and relationships explained above to achieve stability. The sugar may be added after homogenization, but may also be added before homogenization if needed for a particular application.

In another instance, suitable mouthfeel enhancers include sodium chloride, potassium chloride, sodium sulfate, and mixtures thereof. Preferred mouthfeel enhancers include sodium chloride and potassium chloride as well as mixtures thereof; sodium chloride is the most preferred mouthfeel enhancer. Flavors and other additives such as sugar, sweeteners (natural and/or artificial), emulsifiers, fat mimetics, maltodextrin, fibers, starches, gums, and enzyme-treated, cultured, natural, and artificial flavors or flavor extracts can be added so long as they do not significantly and adversely effect the stability. In some approaches, sweeteners may include high intensity natural and/or artificial sweeteners and/or blends of such sweeteners with sucrose. Suitable natural high intensity sweeteners may be stevia, steviol glycosides, stevioside, and/or rebaudioside and the like as well as any mixtures or variations thereof. Suitable artificial high intensity sweeteners may include sucralose (such as Splenda-type sweeteners). In some cases, these high intensity sweeteners when blended with sucrose demonstrate retort stability.

After concentration and optional chilling, the dairy liquid is then mixed with the effective amounts of the stabilizer and optional other ingredients as described above and, then, sterilized to form the stable concentrated dairy liquid. Preferably, sterilization is carried out using retorting conditions. Optionally, if the concentrated dairy liquid needs to be diluted to meet a targeted concentration, the dilution should be accomplished prior to sterilization. Preferably, the dairy liquid is packaged, sealed, and then subjected to sterilization temperatures in any suitable equipment. Sterilization is carried out under time and temperature conditions to achieve a $F_o$ of at least 5 minutes as required for commercial sterility and nominally up to about 13.5 minutes. Generally, the sterilization process consists of a come-up or heating time, a holding time, and a cool-down time. During the come-up time, a temperature of about 118° C. to about 145° C. is achieved in about 1 second to about 30 minutes. The temperature is then maintained at about 118° C. to about 145° C. for about 1.5 seconds to about 15 minutes. The temperature is then cooled below about 25° C. within about 10 minutes or less. Preferably the sample is gently agitated (for instance, by rotating the container) during sterilization to minimize skin formation.

The overall thermal treatment (in this case, optional forewarming, concentration, and sterilization) is controlled to produce the stable concentrated dairy liquid, which preferably has a protein to fat ratio of about 0.4 to about 0.75, while achieving a $F_o$ of at least about 5 and a shelf life of at least about 9 months under ambient conditions. Generally, the stable concentrated dairy liquid of the present invention has a viscosity ranging from about 70 mPa-s to about 4000 mPa-s and, preferably, about 100 mPa-s to about 300 mPa-s at ambient temperatures when measured by a Brookfield RV viscometer at about 20° C. using Spindle #2 at 100 rpm.

The packaging technique used is not particularly limited as long as it preserves the integrity of the dairy product sufficient for the applicable shelf life of the dairy product. For example, milk concentrates can be sterilized or retorted in glass bottles or gable-top cartons, and so forth, which are filled, sealed, and the contents are then thermally processed. The dairy products also can be packaged in larger quantities such as in conventional bag-in-box containers or totes. In one embodiment, pre-sterilized bottles or foil-lined gable-top carton materials may be used. Food packaging systems designated as extended shelf life (ESL) or aseptic packaging systems may also be used, but the methods herein are not limited thereto. The useful food packaging systems include conventional systems applied or applicable to flowable food products, especially milk products and fruit juices. The samples may be gently agitated (e.g., rotating the container) during sterilization to minimize "skin" formation. The dairy product also may be loaded into and transported in bulk form via tanker trucks or rail car tankers.

Although not required to achieve the extended shelf lives associated with dairy products of the present invention, pasteurization and/or ultra-high temperature (UHT) procedures also may be applied to dairy products of the present invention in the event of process interruption and/or for further shelf life enhancement. UHT products are ultrapasteurized and then packaged in sterilized containers. Moreover, one advantage of the present invention is that UHT processing is generally not required to obtain extended shelf lives, such as required by some prior concentrates. For example, if the ultrafiltered/diafiltered product is to be held for an extended period of time (e.g., greater than about a day) before continuing the process, pasteurization of the ultrafiltered product may be undertaken. If desired, intermediate products in the process may be pasteurized if desired so long as the pasteurization does not adversely affect stability of the final product.

In one approach, the resultant stable concentrated dairy liquid is an organoleptically pleasing milk that may be sealed in cartridges or pods to be used in any number of beverage preparation machines. Examples of preferred uses and beverage preparation machines can be found in U.S. Patent Application Publication 2004/0182250, which is incorporated herein by reference in its entirety, and owned by the same assignee as the present specification. The concentration of the milk is beneficial because it allows for larger volumes of the milk to be dispensed from the beverage preparation machines while being able to store a smaller package with less quantity of liquid.

For instance, a cartridge of the concentrated milk may be used to produce an authentic looking frothy milk-based foam desired by consumers in a cappuccino-style beverage. The fat to protein ratios and specified cream addition points form a concentrated dairy liquid having enhanced dairy notes suitable for forming whitened coffee products such as, cappuccinos, lattes, and the like. For instance, the cartridge of the stable concentrated milk may also be suitable for foaming using a low pressure preparation machine and cartridge as described in U.S. Patent Application Publication 2004/0182250 using only pressures below about 2 bar. In other applications, high pressures above 2 bar may also be used.

By another approach, a dairy beverage may also be formed using the stable concentrated dairy liquid. For example, a beverage may be formed by mixing the stable concentrated dairy liquid with an aqueous medium, such as water. The formed dairy beverage may also be dispensed from a cartridge containing the stable concentrated dairy liquid, also described in US. Patent Application Publication 2004/0182250, by passing an aqueous medium through the cartridge to form a beverage by dilution. In one such example, the stable concentrated dairy liquid may preferably be mixed or diluted with the aqueous medium in a ratio of between about 1:1 to about 6:1 to form a dairy beverage.

Advantages and embodiments of the high solids concentrates described herein are further illustrated by the following examples; however, the particular conditions, processing schemes, materials, and amounts thereof recited in these examples, as well as other conditions and details, should not be construed to unduly limit this method. All percentages are by weight unless otherwise indicated.

EXAMPLES

Example 1

The following are samples of various high solids concentrated dairy liquids evaluated for the present disclosure:

TABLE 1A

| Trail | Homo (psi) | TS (%) | Fat (%) | Protein (%) | Sucrose (%) | NaCl (%) | Flavor (%) | Mouthfeel Enhancer |
|---|---|---|---|---|---|---|---|---|
| 5 | 2000/200 | 43.5 | 12.3 | 8.9 | 20.0 | 0.10 | | |
| | 2000/200 | 43.5 | 12.3 | 8.9 | 20.0 | 0.25 | | |
| | 2000/200 | 43.5 | 12.3 | 8.9 | 20.0 | 0.40 | | |
| | 2000/200 | 46.5 | 12.3 | 8.9 | 23.0 | 0.10 | | |
| | 2000/200 | 46.5 | 12.3 | 8.9 | 23.0 | 0.25 | | |
| | 2000/200 | 46.5 | 12.3 | 8.9 | 23.0 | 0.40 | | |
| | 2000/200 | 46.0 | 11.0 | 7.6 | 22.0 | 0.40 | | |
| 10 | 2000/200 | 46.0 | 11.0 | 7.60 | 22.00 | 0.40 | 0.07 | |
| | 2000/200 | 46.0 | 11.0 | 7.60 | 22.00 | 0.40 | 0.2 | |
| | 2000/200 | 46.0 | 11.0 | 7.60 | 22.00 | 0.40 | 0.3 | |
| | 2000/200 | 46.0 | 11.0 | 7.60 | 22.00 | 0.40 | 0.6 | |
| 14 | 2000/200 | 42.9 | 11.00 | 7.60 | 22.00 | 0.40 | 0.08 | |
| | 2000/200 | 42.9 | 11.00 | 7.60 | 22.00 | 0.40 | 0.10 | |
| | 2000/200 | 42.9 | 11.00 | 7.60 | 22.00 | 0.40 | 0.12 | |
| | 2000/200 | 42.6 | 11.00 | 7.60 | 22.00 | 0.40 | 0.45 | |
| | 2000/200 | 42.6 | 11.00 | 7.60 | 22.00 | 0.40 | 0.50 | |
| | 2000/200 | 42.6 | 11.00 | 7.60 | 22.00 | 0.40 | 0.55 | |

TABLE 1B

| | Concentrate Parameters | | | | | Phase Separation Rate | |
|---|---|---|---|---|---|---|---|
| Trial | MSP/DSP (%) | P/BS (post UF) | P/F | Post Retort Status | pH (pre retort) | Comments | 0-5000 sec | 5000-10000 sec |
| 5 | 50/50 | 33 | 0.72 | fluid | | | | |
| | 50/50 | 33 | 0.72 | fluid | | | 0.57 | 0.63 |
| | 50/50 | 33 | 0.72 | fluid | | | 1.08 | 2.86 |
| | 50/50 | 33 | 0.72 | fluid | | | | |
| | 50/50 | 33 | 0.72 | fluid | | | 1.54/2.81 | 4.78/7.03 |
| | 50/50 | 33 | 0.72 | fluid | 6.40 | | 1.07 | 3.19 |
| | 50/50 | 33 | 0.72 | fluid | | | 6.71 | 10.74 |
| 10 | 50/50 | 33 | 0.72 | fluid | 6.54 | Vanilla | 3.52 | 6.82 |
| | 50/50 | 33 | 0.72 | fluid | 6.54 | Vanilla | | |
| | 50/50 | 33 | 0.72 | fluid | 6.54 | Caramel | | |
| | 50/50 | 33 | 0.72 | fluid | 6.54 | Caramel | 2.28 | 5.14 |
| 14 | 50/50 | 33 | 0.72 | fluid | 6.38 | Vanilla | | |
| | 50/50 | 33 | 0.72 | fluid | 6.38 | Vanilla | | |
| | 50/50 | 33 | 0.72 | fluid | 6.38 | Vanilla | | |
| | 50/50 | 33 | 0.72 | fluid | 6.30 | Caramel | | |
| | 50/50 | 33 | 0.72 | fluid | 6.30 | Caramel | | |
| | 50/50 | 33 | 0.72 | fluid | 6.30 | Caramel | | |

TABLE 2A

| | Targets | | | | | | | | |
|---|---|---|---|---|---|---|---|---|---|
| Variable | Homo (Psi) | TS (%) | Fat (%) | Protein (%) | Sucrose (%) | NaCl (%) | Flavor (%) | MSP/DSP (%) | P/BS (post UF) | P/F |
| Vanilla 1 | 2200/200 | 46.00 | 11 | 7.8 | 22 | 0.4 | 0.00 | MSP/DSP (50/50) | 26 | 0.72 |
| Vanilla 2 | 2200/200 | 46.00 | 11 | 7.8 | 22 | 0.4 | 0.00 | MSP/DSP (50/50) | 33 | 0.72 |
| Vanilla 3 | 2200/200 | 46.00 | 11 | 7.8 | 22 | 0.4 | 0.00 | MSP/DSP (50/50) | 40 | 0.72 |
| Caramel 1 | 2200/200 | 46.00 | 11 | 7.8 | 22 | 0.4 | 0.00 | MSP/DSP (50/50) | 26 | 0.72 |
| Caramel 2 | 2200/200 | 46.00 | 11 | 7.8 | 22 | 0.4 | 0.00 | MSP/DSP (50/50) | 33 | 0.72 |
| Caramel 3 | 2200/200 | 46.00 | 11 | 7.8 | 22 | 0.4 | 0.00 | MSP/DSP (50/50) | 40 | 0.72 |

TABLE 2B

| | LumiSizer Slope (%/hour) | | |
|---|---|---|---|
| Variable | 0-10000 sec | 0-5000 sec | 5000-10000 sec |
| Vanilla 1 | | 4.29 | 10.72 |
| Vanilla 2 | | 0.87 | 2.89 |
| Vanilla 3 | | 0.49 | 1.35 |
| Caramel 1 | | 1.92 | 5.65 |
| Caramel 2 | | 0.86 | 2.63 |
| Caramel 3 | | 0.55 | 1.38 |

TABLE 2C

| | Composition | | | | | | | LumiSizer Slope (%/hour) | | |
|---|---|---|---|---|---|---|---|---|---|---|
| | TS (%) | Moisture (%) | Fat (%) | Protein (%) | Lactose (%) | Sucrose (%) | Salt (%) | pH | 0-10000 sec | 0-5000 sec | 5000-10000 sec |
| Vanilla 1 | 43.1 | 56.85% | 10.68 | 8.18 | 0.71 | 21.84 | 0.44 | 6.32 | | 4.29 | 10.72 |
| Vanilla 2 | 43.3 | 56.62% | 10.68 | 8.02 | 0.65 | 22.25 | 0.49 | 6.40 | | 0.87 | 2.89 |
| Vanilla 3 | 42.5 | 57.48 | 10.62 | 7.84 | 0.58 | 21.91 | 0.43 | 6.24 | | 0.49 | 1.35 |
| Caramel 1 | 43.0 | 56.92 | 10.68 | 8.04 | 0.56 | 22.06 | 0.44 | 6.33 | | 1.92 | 5.65 |
| Caramel 2 | 42.4 | 57.54 | 10.19 | 7.82 | 0.67 | 22.11 | 0.43 | 6.32 | | 0.86 | 2.63 |
| Caramel 3 | 42.4 | 57.57 | 10.41 | 7.75 | 0.4 | 21.39 | 0.43 | 6.39 | | 0.55 | 1.38 |

TABLE 3

| | | | | | | Targets | | | | | |
|---|---|---|---|---|---|---|---|---|---|---|---|
| Trial | Var | Homo (psi) | FS (%) | Fat (%) | Protein (%) | Sucrose (%) | NaCl (%) | Flavor (%) | MSP/DSP (%) | P/BS | P/F |
| 2 | 12 | 2000/200 | 46 | 11.9 | 8.6 | 23.00 | 0.370 | 0.040 | 50/50 | 33 | 0.72 |
| 2 | 13 | 2000/200 | 40.3 | 19.8 | 7.80 | 10.0 | 0.200 | 0.040 | 50/50 | 33 | 0.41 |
| 2 | 14 | 2000/200 | 42.3 | 19.0 | 7.50 | 12.0 | 0.200 | 0.040 | 50/50 | 33 | 0.41 |
| 2 | 15 | 2000/200 | 45.3 | 18.8 | 7.30 | 15.0 | 0.200 | 0.040 | 50/50 | 33 | 0.41 |
| 2 | 16 | 2000/200 | 40.4 | 22.8 | 6.50 | 10.0 | 0.200 | 0.040 | 50/50 | 33 | 0.31 |
| 2 | 17 | 2000/200 | 42.4 | 21.6 | 6.30 | 12.0 | 0.200 | 0.040 | 50/50 | 33 | 0.31 |
| 2 | 18 | 2000/200 | 45.4 | 21.6 | 6.16 | 15.0 | 0.200 | 0.040 | 50/50 | 33 | 0.31 |

Example 2

Brew recovery and viscosity were also tested on certain high solids dairy concentrates. Data in provided in the tables below. Vanilla 1, 2, and 3 and Caramel 1, 2, and 3 are compositions from Table 2A.

TABLE 4

| | Latte Brew Recovery (%) | | | |
|---|---|---|---|---|
| | Month | | | |
| Trial Description | 0 | 1 | 2 | 3 |
| Vanilla 1 | 99.3 | 98.7 | 97.9 | 97.5 |
| Vanilla 2 | 99.1 | 98.8 | 97.9 | 97.7 |
| Vanilla 3 | 98.9 | 98.2 | 97.9 | 98.6 |
| Caramel 1 | 99.1 | 99.3 | 98.1 | 98.3 |
| Caramel 2 | 99.0 | 98.7 | 98.3 | 97.5 |
| Caramel 3 | 98.8 | 98.8 | 98.9 | 97.4 |

TABLE 5

| Latte Viscosity, cps (Months at 70° F.) | |
|---|---|
| Description | Initial |
| Vanilla 1 | 54.9 |
| Vanilla 2 | 74.4 |
| Vanilla 3 | 91.8 |
| Caramel 1 | 54.1 |
| Caramel 2 | 56.6 |
| Caramel 3 | 78.3 |

Example 3

A LumiSizer (LUM GmbH, Berlin, Germany) was used to evaluate the initial separation rates between 0 and 5,000 seconds, between 0 and 10,000 seconds, and between 5,000 and 10,000 of various concentrated dairy products set forth in Table 7 below. The initial separation rates are reported in % transmission per hour or TpH in Table 7 below. FIG. 2 is a graph of the LumiSizer data from this Example.

TABLE 6

Dairy Concentrates

| Run | Homo (psi) | TS (%) | Fat (%) | Protein (%) | Sucrose (%) | NaCl (%) | Flavor (%) | MSP/DSP (%) | P/BS (post UF) | P/F |
|---|---|---|---|---|---|---|---|---|---|---|
| A | 2000/200 | 30.04 | 12.73 | 8.64 | 6.22 | 0.41 | 0.04 | 50/50 | 40 | 0.72 |
| B | 2000/200 | 25.71 | 10.75 | 7.26 | 5.61 | 0.35 | 0.08 | 50/50 | 40 | 0.72 |
| C | 2000/200 | 31 | 12.7 | 9.1 | 6.6 | 0.4 | 0.04 | 50/50 | 40 | 0.72 |
| D | 2000/200 | 31 | 12.7 | 9.1 | 6.6 | 0.4 | 0.04 | 50/50 | 60 | 0.72 |
| E | 2000/200 | 28 | 12.7 | 6.4 | 6.6 | 0.4 | 0.04 | 50/50 | 40 | 0.51 |
| F | 2000/200 | 27.95 | 12.7 | 6.4 | 6.6 | 0.4 | 0.04 | 50/50 | 60 | 0.51 |
| G | 2000/200 | 31 | 12.7 | 3.7 | 6.6 | 0.4 | 0.04 | 50/50 | 40 | 0.31 |
| H | 2000/200 | 24.9 | 12.7 | 3 | 6.6 | 0.4 | 0.04 | 50/50 | 60 | 0.31 |

TABLE 7

TpH

| Run | Slope (% T/hr) 0-10,000 Sec |
|---|---|
| A | 0.34 |
| B | 0.56 |
| C | 0.37 |
| D | 0.19 |
| E | 1.33 |
| F | 0.70 |
| G | 8.76 |
| H | 5.33 |

In general, Samples A, B, C, D, and F had TpH values less than 1 and should be very stable. Sample E had a TpH of 1.33 and would be expected to be less stable than values less than 1. Samples G and H had TpH values of 8.76 and 5.33, respectively, and would be expected to be the least stable. In some instances, the slope or TpH value decreases as the protein to buffering salt (P/BS) ratio increases from 40 to 60 for all levels of protein to fat (P/F). In general, the slope or TpH value increases as the protein to fat (P/F) decreases from 0.72 to 0.31 with 0.31 having a directional effect. These relationships are expected to also be characteristic of high solids dairy concentrates with about 38 to about 50 percent total solids.

Example 4

The LumiSizer of Example 3 was used to evaluate dairy concentrates with high levels of total solids and high levels of sugar. Table 8 below represents the concentrates tested and the LumiSizer results.

TABLE 8

LumiSizer results on High Solids Dairy concentrates.

| Milk Base | Sugar % | TS % | DS % | P/F | Time Interval of Initial Linear Slope | LumiSizer Slope, TpH [%/hour] |
|---|---|---|---|---|---|---|
| Skim | 30.20 | 42 | 10.4 | 56.1 | 0-5,000 sec | 2.98 |
| | 34.60 | 46.5 | 10.4 | 56.1 | 0-5,000 sec | 1.35 |
| Whole Milk (WM) | 19.63 | 42 | 20 | 0.87 | 0-3000 Sec | 0.79 |
| | 24.23 | 46.6 | 20 | 0.87 | 0-3000 Sec | 0.56 |
| WM + Cream | 19.84 | 42 | 20 | 0.71 | 0-3000 Sec | 14.68 |
| | 28.74 | 50 | 20 | 0.71 | 0-3000 Sec | 10.94 |
| | 20.02 | 42 | 20 | 0.51 | 0-3000 Sec | 32.65 |
| | 28.02 | 50 | 20 | 0.51 | 0-3000 Sec | 25.4 |
| Cream | 22.00 | 49.11 | 26 | 0.07 | 0-720 sec | 137.18 |
| | 12.00 | 46.6 | 26 | 0.07 | 0-720 sec | 116.79 |
| | 12.00 | 42.2 | 26 | 0.07 | 0-720 sec | 126.34 |

Figure 3:
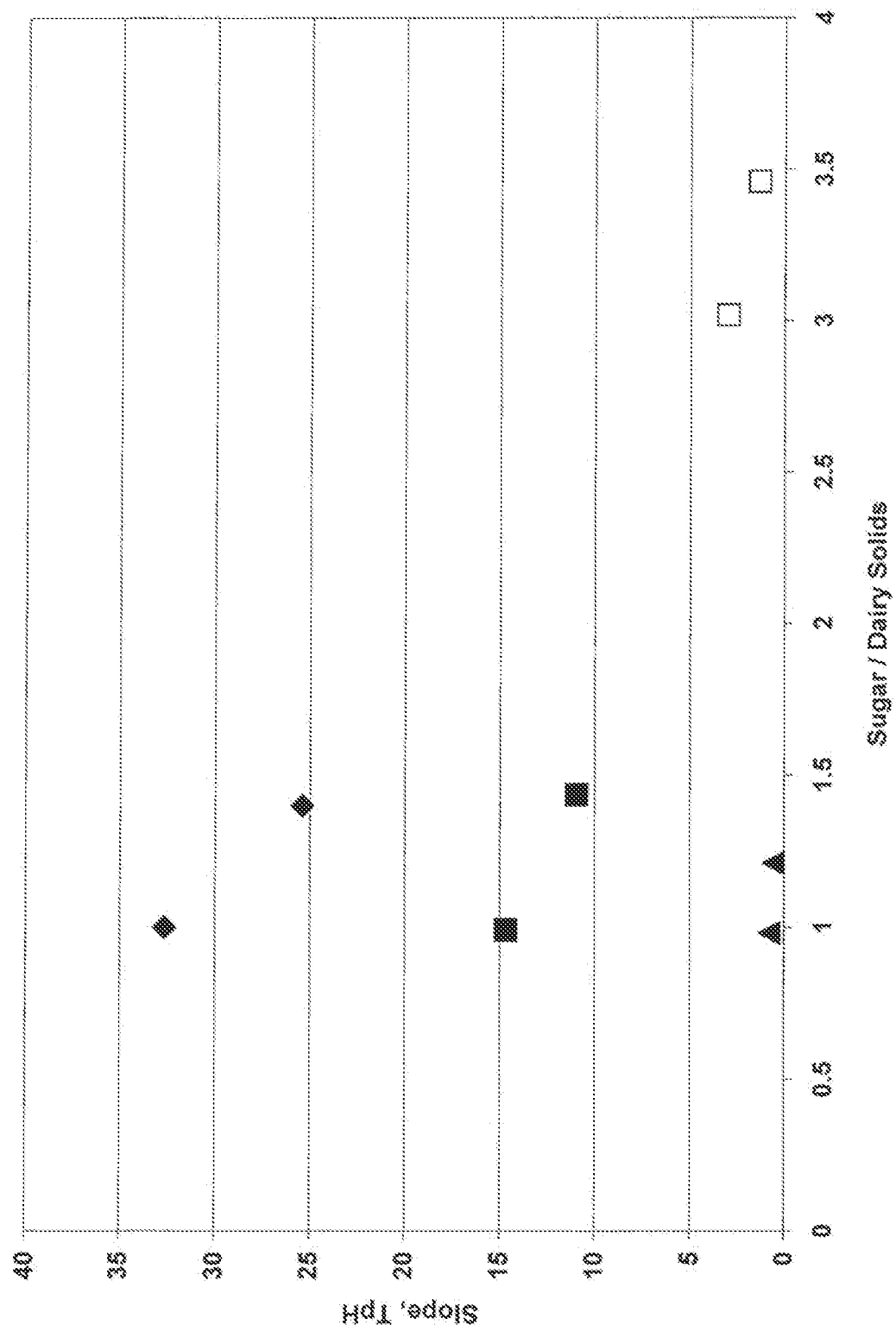
FIG. 3 is a graph showing one relationship of total sugar relative to total dairy solids with respect to LumiSizer phase separation rate.

Relationships of the sugar relative to the dairy solids, protein, and fat also show acceptable ranges of phase separation. These are shown in FIGS. 3 and 4. In FIG. 3, adjacent pairs of data points show the same concentrate formulation with increasing amounts of sugar and show the decreasing TpH or decreasing phase separation rate of a particular concentrate formula as the sugar level increases with the remaining composition held relatively constant.

It will be understood that various changes in the details, materials, and arrangements of the process, formulations, and ingredients thereof, which have been herein described and illustrated in order to explain the nature of the method and resulting concentrate, may be made by those skilled in the art within the principle and scope of the embodied method as expressed in the appended claims.

What is claimed is:

1. A retort stable dairy concentrate comprising:
about 38 to about 50 percent total solids including dairy solids, protein, sugar, and fat, about 0.2 to about 0.6 percent buffering salt, the buffering salt including about 25 to about 50 percent disodium phosphate and about 50 to about 75 percent monosodium phosphate, wherein a ratio of protein to fat is about 0.5 to about 0.9, and wherein a ratio of protein-to-buffering salt is about 40 to about 60;
the dairy solids in an amount from about 10 percent to about 26 percent;
the sugar in an amount from about 10 percent to about 30 percent; and
the amount of sugar relative to the amount of dairy solids is at least about 1:1 to about 3.5:1, such that the dairy concentrate exhibits a phase transmission separation rate from about 0.5 to about 33 TpH.

2. The retort stable dairy concentrate of claim 1, wherein the phase transmission separation rate decreases as the amount of sugar relative to the dairy solids increases.

3. The retort stable dairy concentrate of claim 1, wherein the phase transmission separation is less than a phase transmission separation rate of a dairy concentrate with less than about 38 percent total solids.

4. The retort stable dairy concentrate of claim 1, wherein the amount of sugar is about 20 to about 30 percent.

5. The retort stable dairy concentrate of claim 1, further comprising an amount of lactose ranging from about 0.25 to about 2 percent.

6. A high total solids, retort-stable dairy concentrate comprising:
   about 38 to about 50 percent total solids including dairy solids, protein, sugar, and fat;
   about 0.2 to about 0.6 percent buffering salt, the buffering salt including about 25 to about 50 percent disodium phosphate and about 50 to about 75 percent monosodium phosphate;
   the dairy solids in an amount from about 10 percent to about 26 percent;
   the sugar in an amount from about 10 percent to about 30 percent;
   a protein-to-buffering salt ratio from about 40 to about 60;
   a protein-to-fat ratio from about 0.07 to about 0.9; and
   a ratio of the amount of sugar relative to the protein-to-fat ratio is such that the dairy concentrate exhibits a decreasing phase separation rate (TpH) as the ratio of the amount of sugar relative to the ratio of protein-to-fat decreases characterized by the expression $TpH=-0.0017 ratio^2-1.0259 ratio-12.951$ such that the dairy concentrate remains a homogeneous fluid upon experiencing retort conditions.

7. The retort stable dairy concentration of claim 6, wherein the protein-to-fat relationship is from about 0.5 to about 0.9.

8. The retort stable dairy concentrate of claim 6, wherein the amount of sugar is about 20 to about 30 percent.

9. A high total solids, retort-stable dairy concentrate comprising:
   about 38 to about 50 percent total solids including dairy solids, protein, sugar, and fat wherein a ratio of protein to fat is about 0.5 to about 0.9;
   the dairy solids in an amount from about 10 percent to about 30 percent including about 1 to about 11 percent dairy protein and about 0.25 to about 2 percent lactose;
   the sugar in an amount from about 10 to about 30 percent;
   about 0.2 to about 0.6 percent buffering salt, the buffering salt including about 25 to about 50 percent disodium phosphate and about 50 to about 75 percent monosodium phosphate;
   a ratio of protein to buffering salt from about 40 to about 60; and
   a phase separation rate of about 10 TpH or less such that the dairy concentrate remains a homogeneous fluid upon experiencing retort conditions including being heated to a temperature between about 250° F. to about 254° F. for about 5 to about 8.5 minutes.

10. The retort stable dairy concentrate of claim 9, wherein the buffering salt is selected from the group consisting of monosodium phosphate, disodium phosphate, trisodium citrate, and blend thereof.

11. The retort stable dairy concentrate of claim 1, further comprising a buffering salt comprising a 50/50 blend of monosodium phosphate and disodium phosphate.

12. The retort stable dairy concentrate of claim 6, further comprising a buffering salt comprising a 50/50 blend of monosodium phosphate and disodium phosphate.

13. The retort stable dairy concentrate of claim 9, further comprising a buffering salt comprising a 50/50 blend of monosodium phosphate and disodium phosphate.

* * * * *